United States Patent
Kanayama

(10) Patent No.: US 9,991,481 B2
(45) Date of Patent: Jun. 5, 2018

(54) THERMAL INSULATING COVER

(71) Applicant: INOAC CORPORATION, Nagoya-shi, Aichi (JP)

(72) Inventor: Manabu Kanayama, Anjo (JP)

(73) Assignee: Inoac Corporation, Nagoya-shi (JP)

( * ) Notice: Subject to any disclaimer, the term of this patent is extended or adjusted under 35 U.S.C. 154(b) by 168 days.

(21) Appl. No.: 14/892,166

(22) PCT Filed: May 27, 2014

(86) PCT No.: PCT/JP2014/063928
§ 371 (c)(1),
(2) Date: Nov. 18, 2015

(87) PCT Pub. No.: WO2014/192723
PCT Pub. Date: Dec. 4, 2014

(65) Prior Publication Data
US 2016/0099442 A1    Apr. 7, 2016

(30) Foreign Application Priority Data

May 29, 2013 (JP) .................................. 2013-113492
Oct. 28, 2013 (JP) .................................. 2013-223493

(51) Int. Cl.
*H01M 2/04*    (2006.01)
*H01M 10/658*    (2014.01)
(Continued)

(52) U.S. Cl.
CPC .............. *H01M 2/043* (2013.01); *B60R 16/04* (2013.01); *H01M 2/0262* (2013.01);
(Continued)

(58) Field of Classification Search
None
See application file for complete search history.

(56) References Cited

U.S. PATENT DOCUMENTS

| 4,681,239 A * | 7/1987 | Manns ............... B65D 81/3879 215/12.1 |
| 2006/0043250 A1 | 3/2006 | Farrell |
| 2012/0003508 A1 * | 1/2012 | Narbonne ........... H01M 2/1077 429/8 |

FOREIGN PATENT DOCUMENTS

| JP | 53-56166 U | 5/1978 |
| JP | 58-116579 U | 8/1983 |

(Continued)

OTHER PUBLICATIONS

Shanks et al, Thermoplastic Elastomers pp. 137-138, InTech (2012).*

*Primary Examiner* — Yoshitoshi Takeuchi
(74) *Attorney, Agent, or Firm* — Norton Rose Fulbright US LLP

(57) ABSTRACT

A thermal insulating cover which can be easily fitted on an object.
[Means for solution] A thermal insulating cover 10 to be fitted on a battery B so that a wall portion 12 in a cylindrical form of the cover covers the entire periphery of the side surface of the battery B. The wall portion 12 has a general portion 18, which is disposed to be separate from the side surface of the battery B, and a sealing portion 20, which is formed to protrude inward more than the general portion 18 and elastically abutting on the side surface of the battery B. The thermal insulating cover 10 closes an upper side of a space G formed between the side surface of the battery B and the general portion 18 by the sealing portion 20.

6 Claims, 10 Drawing Sheets

(51) Int. Cl.
*B60R 16/04* (2006.01)
*H01M 2/10* (2006.01)
*H01M 10/625* (2014.01)
*H01M 2/02* (2006.01)

(52) U.S. Cl.
CPC ....... *H01M 2/0277* (2013.01); *H01M 2/1094* (2013.01); *H01M 10/625* (2015.04); *H01M 10/658* (2015.04); *H01M 2220/20* (2013.01)

(56) References Cited

FOREIGN PATENT DOCUMENTS

| | | |
|---|---|---|
| JP | 10-59437 A | 3/1998 |
| JP | P2004-534699 A | 11/2004 |
| JP | U3122083 | 6/2006 |
| JP | P2008-274470 A | 11/2008 |
| WO | WO 03/033832 A1 | 4/2003 |

\* cited by examiner

F I G. 2
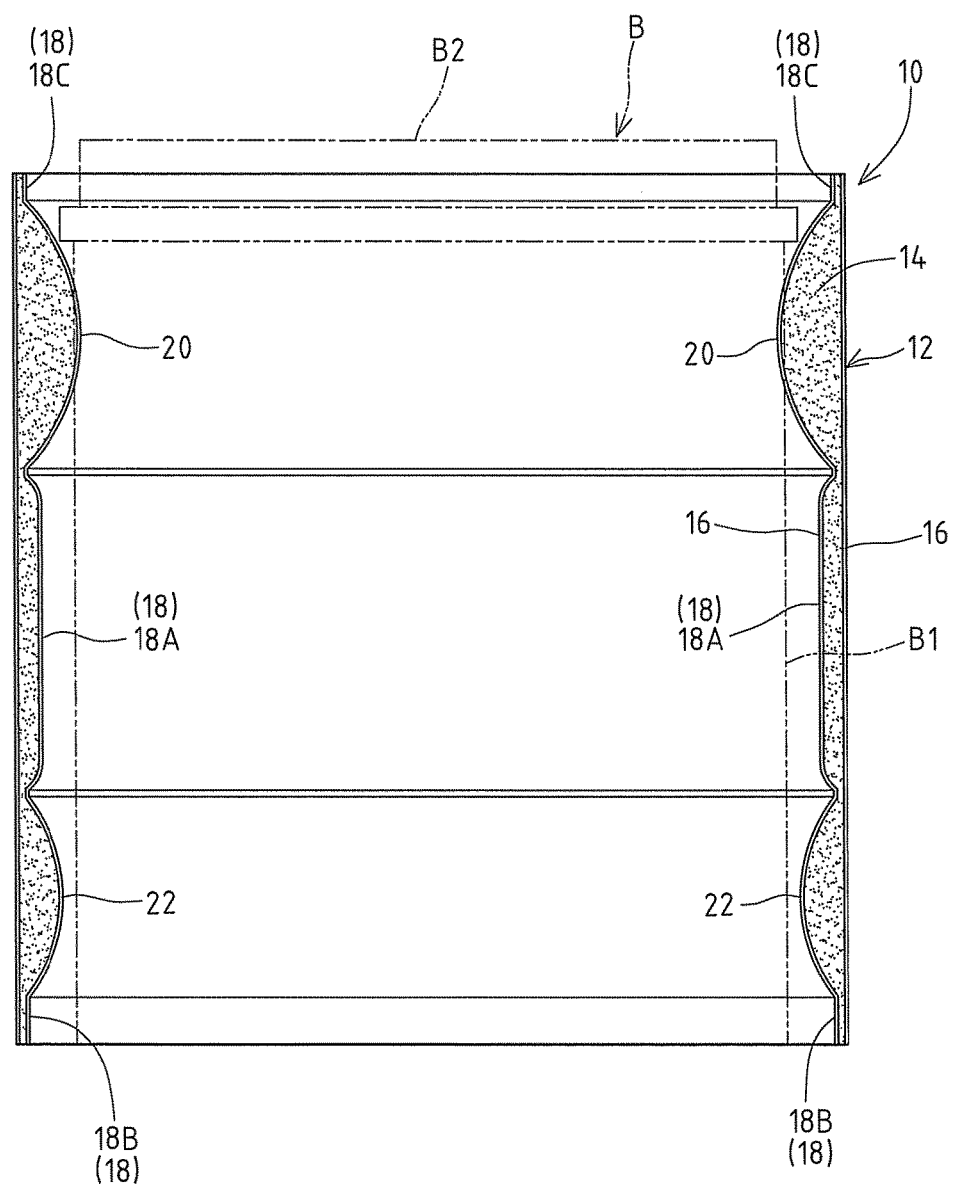

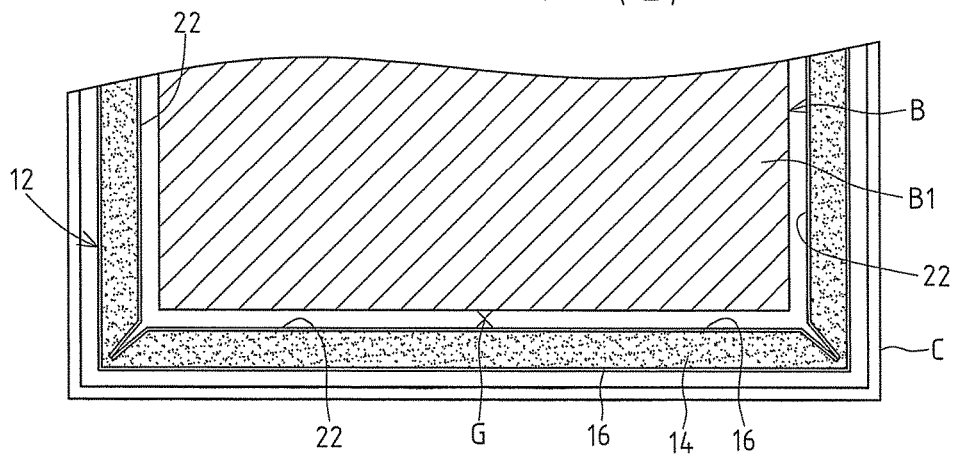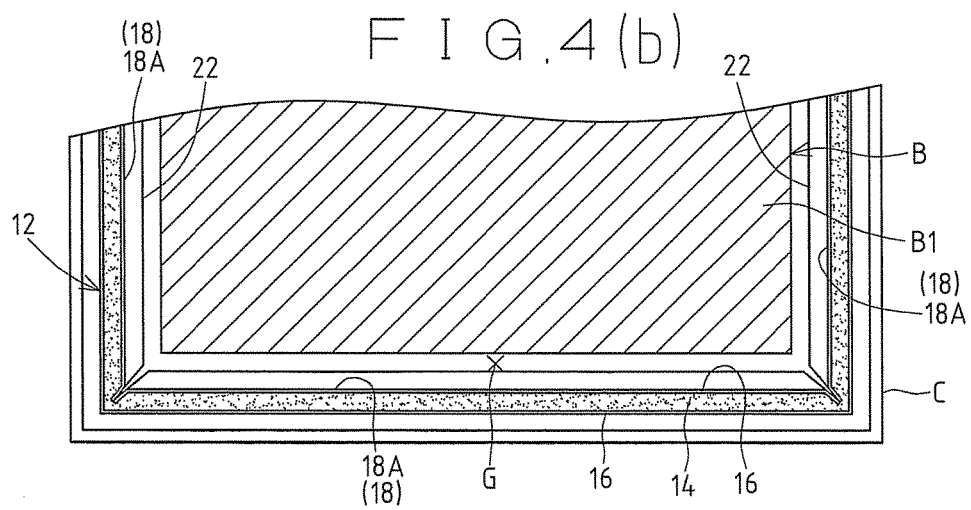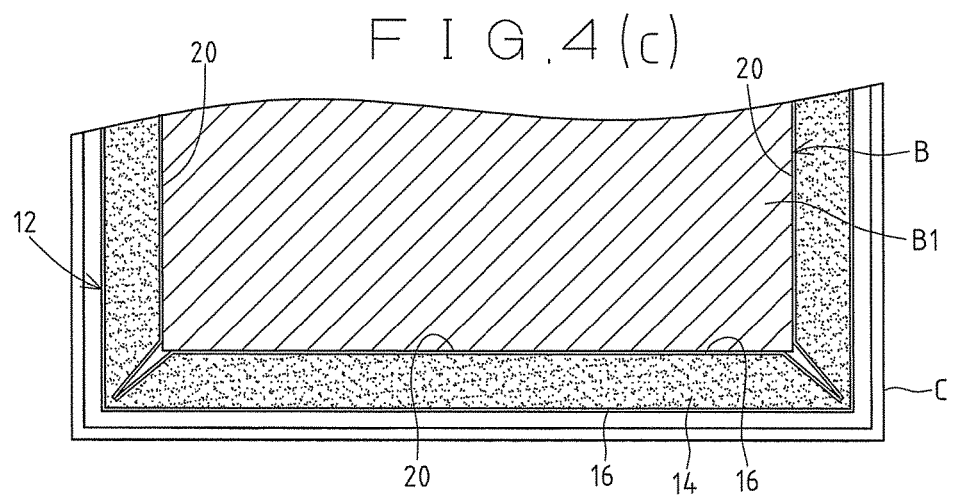

THERMAL INSULATING COVER

TECHNICAL FIELD

The present invention relates to a thermal insulating cover which is fitted on an object to be thermally-insulated, such as a battery, to cover the entire periphery of the side surface of the object, and to a method for producing the same.

BACKGROUND ART

A vehicle, such as an automobile, has a battery installed. Particularly, the inside of an engine room of a vehicle is affected by a temperature increase due to the engine or an environment, such as the season, and suffers a large temperature change, and hence it has been known that a battery installed in the engine room deteriorates or the battery becomes unstable in the performance. Thus, the battery is covered by a thermal insulating cover so that the effect of the ambient temperature on the battery is suppressed (see, for example, patent document 1).

PRIOR ART REFERENCE

Patent Document

Patent document 1: Japanese Utility Model Registration No. 3122083

SUMMARY OF THE INVENTION

Problems to be Solved by the Invention

The above-mentioned cover is formed in a cylindrical form and fitted on a battery from above to cover the entire periphery of the side surface of the battery. For securing incorporation properties of the cover to the battery, the inner opening size of the cover is set to be larger than the external shape size of the battery so that there is a margin for size. For this reason, when the cover is fitted on the battery, a gap communicating with the outside of the cover is disadvantageously formed between the side surface of the battery and the cover. When such a gap is formed between the battery and the cover, heat goes into and out of the cover through the gap, so that the intended thermal insulation performance cannot be secured.

Accordingly, the present invention has been proposed in order to advantageously solve the above-mentioned problems in the prior art, and its object is to provide a thermal insulating cover which can be easily fitted on an object to be thermally-insulated and can secure the desired thermal insulation performance, and a method for producing the same.

Means for Solving the Problems

So as to overcome the above problems and to achieve the intended object, the gist of a thermal insulating cover according to the invention of claim 1 of the present application is a thermal insulating cover which is fitted on an object to be thermally-insulated so that the wall portion in a cylindrical form of the cover covers the entire periphery of the side surface of the object, wherein the wall portion has a general portion disposed to be separate from the side surface of the object to be thermally-insulated, and a protruding portion formed to protrude inward more than the general portion and elastically abutting on the side surface of the object to be thermally-insulated, and the wall portion is constructed so that the protruding portion formed at least in an abutting position on an upper portion of the side surface of the object to be thermally-insulated closes a space formed between the side surface of the object to be thermally-insulated and the general portion.

According to the invention of claim 1, the general portion of the thermal insulating cover is formed so as to be separate from the side surface of the object to be thermally-insulated to suppress the abutting range of the protruding portion abutting on the side surface of the object to be thermally-insulated; accordingly, a load caused when fitting the thermal insulating cover is on the object to be thermally-insulated can be reduced. Further, the thermal insulating cover is constructed so that when it is fitted on an object to be thermally-insulated, the protruding portion closes the space formed between the general portion and the side surface of the object to be thermally-insulated, and therefore not only the wall portion but also a layer of air present in the space can be utilized to achieve thermal insulation.

In the invention of claim 2, the gist is that the wall portion of the thermal insulating cover has the protruding portion which is formed by compression-deforming a thermal insulating layer, which is constructed by a foam body constituting the wall portion, into a shape that extends along the circumferential direction of the wall portion and has upper and lower slanting surfaces, and the protruding portion is constructed so that the density of the thermal insulating layer gradually decreases in the direction from each of the upper and lower ends of protrusion continuous to the general portion toward the middle portion side as viewed in the vertical direction.

According to the invention of claim 2, the protruding portion is constructed so that the density of the thermal insulating layer constituting the protruding portion is gradually reduced in the direction from each of the upper and lower ends of protrusion toward the middle portion side as viewed in the vertical direction. Therefore, the distal end side abutting the side surface of the object to be thermally-insulated becomes relatively soft and, on the other hand, the repulsion force against the elastic deformation increases on the proximal end side of protrusion, and hence it is possible to reduce the load caused when the thermal insulating cover is fitted on the object to be thermally-insulated and to secure the sealing properties of the cover by the protruding portion after being fitted.

In the invention of claim 3, the gist is that the thermal insulating cover has, at the lower portion of the wall portion, a second protruding portion which is formed to protrude inward more than the general portion and has a smaller inward protruding size than that of the protruding portion.

According to the invention of claim 3, the wall portion of the thermal insulating cover can be reinforced by the second protruding portion. Further, the second protruding portion can reduce the gap with the side surface of the object to be thermally-insulated.

In the invention of claim 4, the gist is that the thermal insulating cover has, at the lower portion of the wall portion, the protruding portion which is formed to protrude inward more than the general portion and elastically abut on the side surface of the object to be thermally-insulated.

According to the invention of claim 4, when the thermal insulating cover is fitted on an object to be thermally-insulated, a space formed between the general portion and the side surface of the object to be thermally-insulated is closed by the upper and lower protruding portions, and by virtue of this construction, not only the wall portion but also a layer of air present in the space can be utilized to achieve thermal insulation. In addition, with respect to the space formed between the general portion and the side surface of the object to be thermally-insulated, the upper side of the space is closed by the protruding portion formed on the upper side of the wall portion, and the lower side of the space is closed by the protruding portion formed on the lower side of the wall portion, and therefore the flow of air to the space can be suppressed to improve the thermal insulation properties.

In the invention of claim 5, the gist is that the wall portion of the thermal insulating cover is formed from a foam body and a skin material which are stacked on one another so that the skin material is on the surface side and of which stacked surfaces are bonded together, and the wall portion has a covering portion comprised of an adhesive and formed to cover a region from an end face through which the foam body is exposed to an edge of the skin material.

According to the invention of claim 5, the end of the wall portion in a region from the end face to the edge is covered by the covering portion, and therefore the end face through which the mating surface of the foam body and the skin material is exposed can be protected by the covering portion. In other words, the covering portion can prevent the foam body and the skin material from being separated from each other due to such a cause that, for example, water intrudes into the end face of the wall portion, or the end face comes into contact with other members. In addition, the covering portion itself is constructed by an adhesive having adhesive force, and therefore it can be easily formed on the end of the wall portion and further is unlikely to be peeled off from the end.

In the invention of claim 6, the gist is that the covering portion is constructed by a hot-melt adhesive.

According to the invention of claim 6, the covering portion is constructed by a hot-melt adhesive, and thus the covering portion can be more easily formed.

In the invention of claim 7, the gist is that the covering portion is colored to match the color of the skin material.

According to the invention of claim 7, the end face of the wall portion of the cover is covered by the covering portion that has a color selected to match the color of the skin material constituting the surface of the wall portion, and therefore, even when the color of the foam body exposed through the end face is different from that of the skin material, the foam body can be concealed by the covering portion to improve the appearance of the wall portion.

So as to overcome the above problems to achieve the intended object, the gist of a method for producing a thermal insulating cover according to the invention of claim 8 of the present application is a method for producing a thermal insulating cover which is fitted on an object to be thermally-insulated so that the wall portion in a cylindrical form of the cover covers the entire periphery of the side surface of the object, the method comprising:

compressing, while heating, a plate material, including at least a foam body, by pressing one side of the plate material in parallel with a space in between to form a protruding portion between compression-shaped pressed portions, and compressing, while heating, the plate material by pressing the one side over a predetermined range to form a compression-shaped general portion to be depressed to be lower than the distal end of the protruding portion, and shaping the resultant plate material into a cylindrical form so that the protruding portion and the general portion are positioned inside to form a wall portion which has the general portion disposed to be separate from the side surface of the object to be thermally-insulated and at least one protruding portion elastically abutting on the upper portion of the side surface of the object to be thermally-insulated, when the cover is fitted on the object to be thermally-insulated.

According to the invention of claim 8, a thermal insulating cover having, in the wall portion, a general portion, which is separate from the side surface of the object to be thermally-insulated, and a sealing portion, which is abutting on the side surface of the object to be thermally-insulated, can be easily obtained.

In the invention of claim 9, the gist is that the plate material is compressed, while heating, by pressing one side of the plate material in parallel with a space therebetween, which is smaller than a space for a pair of the pressed portions having the protruding portion disposed, thus forming a second protruding portion that is lower than the protruding portion between compression-shaped second pressed portions.

According to the invention of claim 9, the protruding height of the protruding portion can be easily controlled by changing the space between the pressed portions.

In the invention of claim 10, the gist is that the plate material has the foam body and a skin material, which is stacked on the foam body by an adhesive that exhibits adhesive force when heated, and the foam body and the skin material are bonded together by heating during compression-shaping for the pressed portions and the general portion.

According to the invention of claim 10, the procedure for preliminarily bonding together the foam body and skin material can be omitted.

In the invention of claim 11, the gist is that an end of the plate material formed by the foam body and the skin material, which are stacked on one another so that the skin material is on a surface side and of which stacked surfaces are bonded together, is immersed in an adhesive in a liquid state, and then the adhesive applied to the end is solidified thus forming a covering portion comprised of the adhesive to cover a region from an end face through which the foam body is exposed to an edge of the skin material.

According to the invention of claim 11, the covering portion can be easily formed on the end of the plate material using an adhesive. The end of the obtained plate material in a region from the end face to the edge is covered by the covering portion, and therefore the end face through which the mating surface of the foam body and the skin material is exposed can be protected by the covering portion. More specifically, the covering portion can prevent the foam body and the skin material from being separated from each other due to such a cause that, for example, water intrudes into the end face of the plate material, or the end face comes into contact with other members.

Advantageous Effect of the Invention

The thermal insulating cover of the present invention can be easily fitted on an object to be thermally-insulated and can secure the desired thermal insulation performance. Further, according to the method for producing a thermal insulating cover of the present invention, a thermal insulating cover which can be easily fitted on an object to be thermally-insulated and can secure the desired thermal insulation performance can be easily produced.

BRIEF DESCRIPTION OF THE DRAWINGS

FIG. 2 is a longitudinal cross-sectional view showing the thermal insulating cover of the embodiment.

FIG. 4(a) is a cross-sectional view of an essential portion taken along the line X1-X1 of FIG. 3, FIG. 4(b) is a cross-sectional view of an essential portion taken along the line X2-X2 of FIG. 3, and FIG. 4(c) is a cross-sectional view of an essential portion taken along the line X3-X3 of FIG. 3.

MODE FOR CARRYING OUT THE INVENTION

Hereinbelow, a thermal insulating cover and method for producing the same according to the present invention will be described on preferred embodiments with reference to the accompanying drawings. In the embodiments, an explanation is made taking, as an example of an object to be thermally-insulated, a battery to be installed in an engine room or an interior of a vehicle, such as an automobile.

Embodiments

Figure 1:
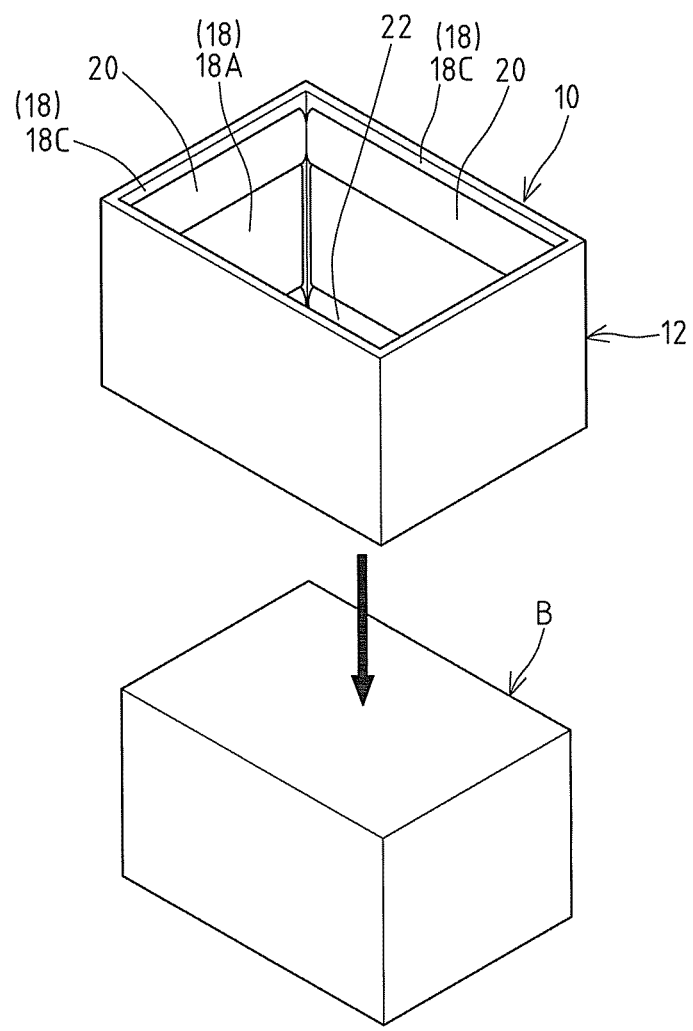
FIG. 1 is a diagrammatic perspective view showing a state in which the thermal insulating cover according to an embodiment of the present invention is being fitted on a battery.

As shown in FIG. 1, a thermal insulating cover 10 according to an embodiment has a wall portion 12 which is formed in an angled-cylindrical shape according to the external shape of a battery B in a rectangular box shape to open on the upper and lower sides, and this cover 10 is fitted on the battery B from the top so that the wall portion 12 covers the entire periphery of the side surface of the battery B. In the battery B of this embodiment, the outer edge of a lid portion B2 disposed on the upper portion of a box body B1 extends slightly outward as viewed from the side surface of the box body B1. Further, the battery B is placed on a supporting plate C in a substantially tray shape (see FIG. 3). When fitted on the battery B, the positioning of the thermal insulating cover 10 in the vertical direction is made with the lower end of the wall portion 12 being pressed against the supporting plate C. The thermal insulating cover 10 has the wall portion 12 having four sides corresponding to the four sides of the battery B, and can be folded or expanded using the corner portion connecting the adjacent wall portions 12, 12 as a hinge so as to be changed in shape from an angled-cylindrical shape to a flat plate form in a folded state, and further it can follow the shape of the battery B. In other words, the thermal insulating cover 10 can be commonly used for batteries B having similar sizes.

Figure 3:
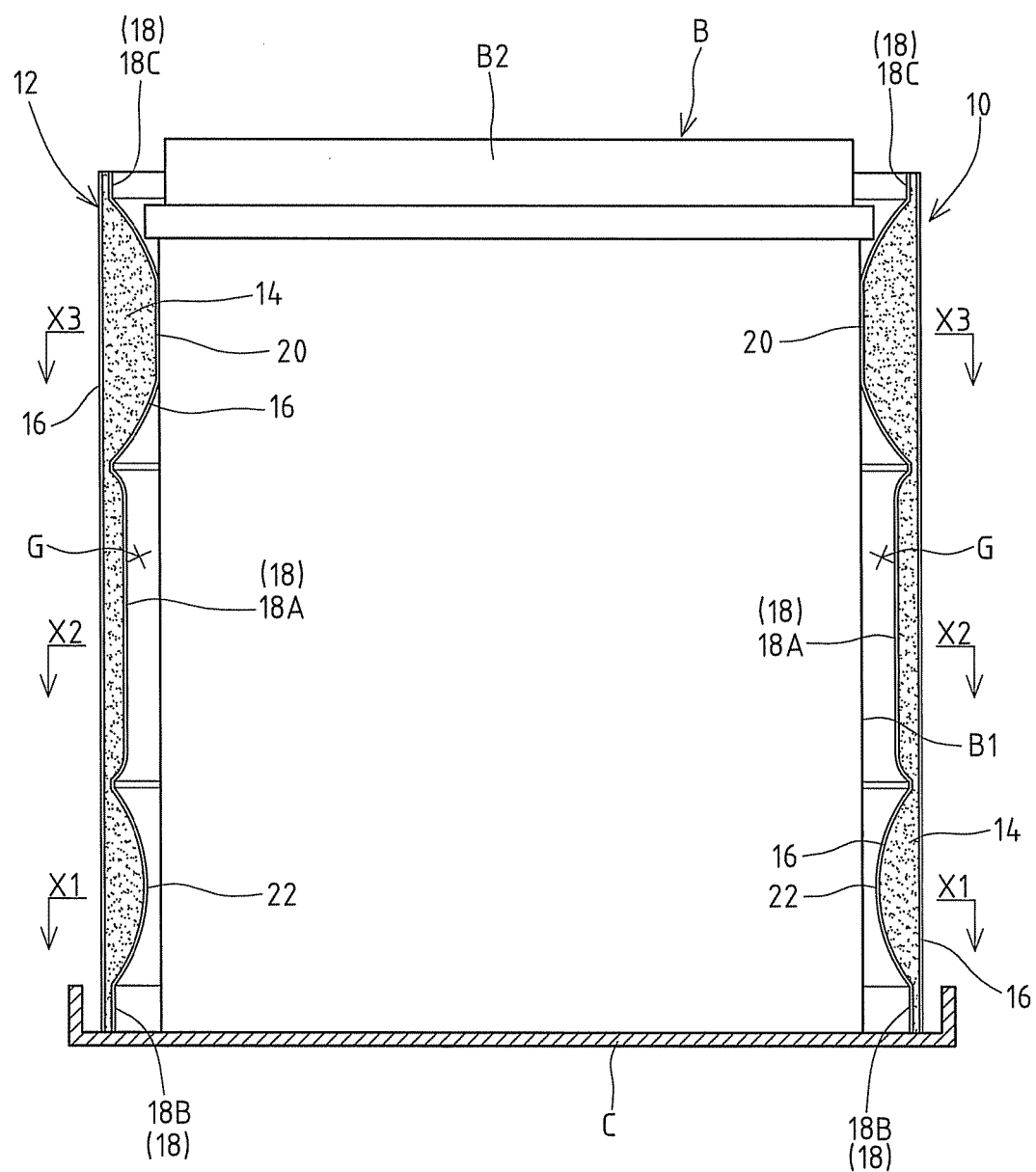
FIG. 3 is a longitudinal cross-sectional view showing a state in which the thermal insulating cover of the embodiment has been fitted on a battery.

The above-mentioned wall portion 12 of the thermal insulating cover 10 has thermal insulation properties. As shown in FIGS. 2 and 3, the wall portion 12 of the embodiment is of a multilayer structure comprised of a thermal insulating layer 14 having elasticity and skin layers 16, 16 disposed to cover both surfaces of the thermal insulating layer 14 and protect the thermal insulating layer 14, and it is constructed to be elastically deformable in the thickness direction. More specifically, in this thermal insulating cover 10, the inner surface facing the battery B is formed from a skin layer 16, and the outer surface is formed from the skin layer 16. Further, the wall portion 12 is formed to have low air permeability. It is preferable that the thermal insulating cover 10 placed in an engine room have flame retardancy.

The above-mentioned thermal insulating layer 14 is formed from a foam body F, such as a polyurethane foam or an olefin foam, e.g., a polyethylene foam (see FIG. 6), and, of these, a polyurethane foam is preferred. The foam body F may be of either soft or semi-rigid, and preferably has excellent thermoformability from the viewpoint of the production. The foam body F is preferably of a closed-pore structure having low air permeability, and, in an uncompressed state before constituting the wall portion 12, one having an air permeability (JIS (Japanese Industrial Standards) K 6400-7) in the range from 1.0 to 80 ml/cm$^2$·s is preferred. When the foam body F having an air permeability in the above range constitutes the thermal insulating layer 14, transfer of heat caused due to passing of air can be suppressed, making it possible to improve the thermal insulation properties of the wall portion 12. Further, in an uncompressed state before constituting the wall portion 12, the foam body F having the density in the range from 11 to 30 kg/m$^3$ is preferred, and, when the foam body F having the density in this range constitutes the thermal insulating layer 14, the weight of the thermal insulating cover 10 can be reduced.

The above-mentioned skin layer 16 has flexibility to follow the elastic deformation of the thermal insulating layer 14, water repellency, and wear resistance. The skin layer 16 is formed from a skin material S, for example, fabric, such as nonwoven fabric or woven fabric, or a film material of a synthetic resin (see FIG. 6), and, of these, the nonwoven fabric is preferred. The nonwoven fabric may be the one which is obtained by any method of, for example, a needle punch method, a spun bond method, and a thermal bond method, and the nonwoven fabric having a basis weight in the range from 50 to 110 g/m$^2$ is preferred. Further, the skin material S desirably has appropriate elongation properties so that the material follows the deformation of the foam body F to be molded when the plate material P formed from the foam body F and the skin material S which are stacked on one another (see FIG. 6) is subjected to compression-shaping to obtain the wall portion 12.

As shown in FIG. 3, the above-mentioned wall portion 12 has a general portion 18, which is disposed to be separate from the side surface of the box body B1 of the battery B when the thermal insulating cover 10 is fitted on the battery B, and a sealing portion (protruding portion) 20, which is formed to protrude inward more than the general portion 18 (toward the battery B side) and elastically abut on the side surface of the box body B1. In the wall portion 12, the sealing portion 20 is formed at least in the abutting position on the upper portion of the side surface of the box body B1 of the battery B, and the resultant sealing portion 20 closes the upper side of the space G formed between the side surface of the box body B1 and the general portion 18. In other words, in the wall portion 12, the above-mentioned sealing portion 20 is formed at least in the end portion (upper end portion in this embodiment) on the other side of the end portion of the insert side (lower end portion in this embodiment) when fitting the thermal insulating cover 10 on the battery B, and, in this embodiment, a single line of the sealing portion 20 extending along the width direction (circumferential direction) in the upper portion of the wall portion 12 is formed (see FIGS. 1 and 5). Further, the wall portion 12 has a reinforcing portion (second protruding portion) 22 which is formed to protrude inward more than the general portion 18 and to have a smaller inward protruding size from the general portion 18 than that of the sealing portion 20. The reinforcing portion 22 is formed to extend along the width direction (circumferential direction) of the wall portion 12, and is disposed to separate from the sealing portion 20 in the vertical direction and to be parallel with the sealing portion 20. The reinforcing portion 22 is constituted so as to be separate from the side surface of the box body B1 of the battery B when the thermal insulating cover 10 is fitted on the battery B.

As shown in FIGS. 2 and 3, the above-mentioned wall portion 12 has the sealing portion 20 formed at the upper portion thereof, the reinforcing portion 22 formed at the lower portion thereof, a general portion (which is referred to as "an intermediate general portion 18A" when distinguished from the others) extending between the sealing portion 20 and the reinforcing portion 22, a general portion (a lower general portion 18B) extending toward the lower side of the reinforcing portion 22, and a general portion (an upper general portion 18C) extending toward the upper side of the sealing portion 20. Thus, the wall portion 12 has the sealing portion 20, the general portion 18, and the reinforcing portion 22 which are provided in the vertical direction (the insert direction when fitting the cover), and the inner surface of the wall portion 12 is not formed to be a flat surface along the side surface of the box body B1 of the battery B, but formed to have a portion which can abut on the side surface of the box body B1 and a portion which does not abut on the side surface in the vertical relationship. In other words, the wall portion 12 is constructed so that the sealing portion 20 abuts on a part of the range as viewed in the vertical direction of the side surface of the box body B1 along the width direction of the side surface, but is not in contact with the entirety of the side surface of the box body B1 in the vertical direction. The outer surface of the wall portion 12 is formed to be substantially flat.

The above-mentioned thermal insulating cover 10 is formed so that the inner region defined by the general portion 18 of the wall portion 12 on the four sides is larger than the external shape of the box body B1 of the battery B (see FIG. 4(b)). Further, the thermal insulating cover 10 is formed so that the inner region defined by the distal end of the sealing portion 20 of the wall portion 12 on the four sides is smaller than the external shape of the box body B1 of the battery B (see FIG. 4(c)). Further, the thermal insulating cover 10 is formed so that the inner region defined by the distal end of the reinforcing portion 22 of the wall portion 12 on the four sides is larger than the external shape of the box body B1 of the battery B (see FIG. 4(a)). The thickness size of the sealing portion 20 is set to be larger than that of the general portion 18 (see FIG. 2). The thickness size of the reinforcing portion 22 is set to be larger than that of the general portion 18 and smaller than the thickness size of the sealing portion 20. In the embodiment, the vertical width of the reinforcing portion 22 is set to be smaller than the vertical width of the sealing portion 20. When fitted on the battery B, the thermal insulating cover 10 is positioned in the horizontal direction with respect to the battery B by abutting the sealing portion 20 on the side surface of the box body B1 of the battery B, so that the general portion 18 and the reinforcing portion 22 are disposed to be separate from the side surface of the box body B1. Then, as shown in FIG. 3, in the thermal insulating cover 10, both sealing portion 20, which is formed at the upper portion of the wall portion 12 and abuts on the upper portion of the side surface of the box body B1 of the battery B, and the lower end of the wall portion 12, which is abutting on the supporting plate C, seal the above-mentioned space G.

Figure 5A:
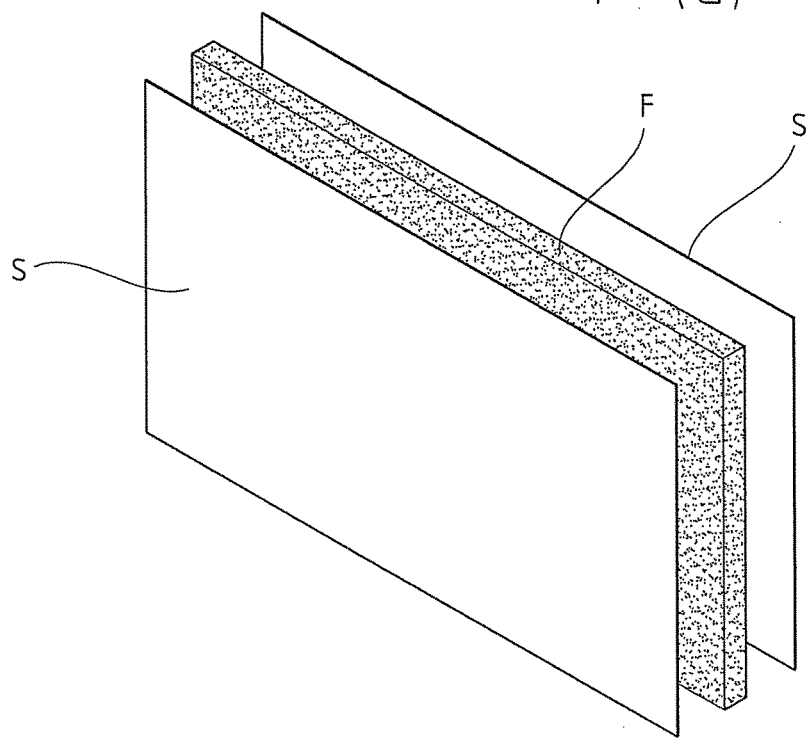
FIG. 5(a) is a diagrammatic perspective view showing the separated state of skin materials before being stacked on both sides of a foam body.
Figure 5B:
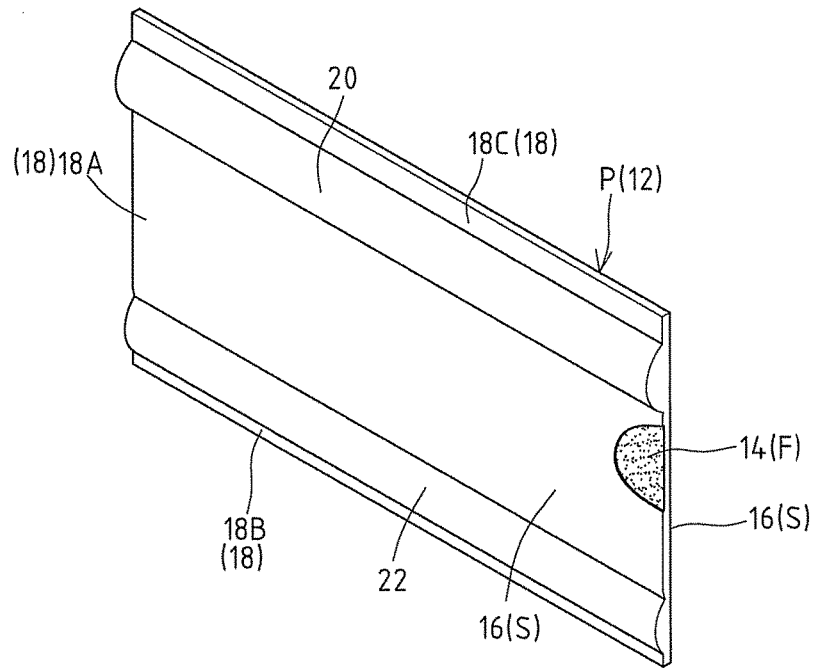
FIG. 5(b) is a diagrammatic perspective view showing a part of the wall portion of the thermal insulating cover of the embodiment.

The above-mentioned sealing portion 20 and reinforcing portion 22 are formed by compression-deforming to the thermal insulating layer 14, constructed by the foam body F constituting the wall portion 12, into a rising mountain-like shape, of which the ridge of the top extends in the width direction (circumferential direction) of the wall portion 12, and which has upper and lower slanting surfaces (see FIGS. 2 and 5). Further, the sealing portion 20 and the reinforcing portion 22 are individually formed so that each distal end is arc, and each of the distal ends is disposed in a substantially middle portion as viewed in the vertical direction within the vertical width of the sealing portion 20 and the reinforcing portion 22. Further, the sealing portion 20 and the reinforcing portion 22 are constructed so that the density of the thermal insulating layer 14 is gradually reduced in the direction from each of the upper and lower ends of protrusion continuous to the general portion 18 toward the middle portion side as viewed in the vertical direction. In other words, in the sealing portion 20 and the reinforcing portion 22, the thermal insulating layer 14 is not compressed or has a small compression amount on the side of the middle portion as viewed in the vertical direction (vertical middle portion) having the distal end, and the compression amount of the thermal insulating layer 14 is gradually increased in the direction from the vertical middle portion toward each of the upper and lower proximal ends of the protrusion. The sealing portion 20 and the reinforcing portion 22 are relatively soft at the peak top in the vertical middle portion, and their repulsion force against the elastic deformation gradually increases in the direction from the vertical middle portion toward the upper or lower side. The sealing portion 20 is constructed so that the sealing portion is deformed relatively easily in the initial deformation and, as the deformation amount increases, the upper and lower portions having higher density are deformed to increase the repulsion force. The middle portion as viewed in the vertical direction (vertical middle portion) of the reinforcing portion 22 is compressed more strongly than the vertical middle portion of the sealing portion 20, and the density of the thermal insulating layer 14 at the vertical middle portion of the reinforcing portion 22 is higher than that of the thermal insulating layer 14 at the vertical middle portion of the sealing portion 20. Further, the vertical middle portion of the sealing portion 20 is formed to be softer than the vertical middle portion of the reinforcing portion. The density of the thermal insulating layer 14 constituting the general portion 18 is higher than the density of the thermal insulating layer 14 constituting the vertical middle portion of the sealing portion 20 and the vertical middle portion of the reinforcing portion 22.

Next, a method for producing thermal insulating cover 10 of the embodiment will be described below. In the following description, with respect to the plate material P which is formed into the thermal insulating cover 10, the direction corresponding to the vertical direction of the wall portion 12 is referred to as a "shorter direction", and the direction corresponding to the width direction (circumferential direction) of the wall portion 12 is referred to as a "longer direction". The skin materials S, S in a sheet form are respectively stacked, through an adhesive, on both surfaces of the above-mentioned foam body F formed into a plate form, and the plate material P having two skin materials S, S stacked with the foam body F in between is set in a shape-forming means 30 (see FIGS. 6(a) and 6(b)). As an adhesive, one which exhibits adhesive force when heated during the below-mentioned compression-shaping is used, and the plate material P is formed by merely stacking on the foam body F the skin material S having an adhesive applied thereto, and, in the plate material P set in the shape-forming means 30, the foam body F and the skin material S are not bonded. As an adhesive, for example, a thermosetting resin adhesive or a hot-melt adhesive can be used, and, for example, a resorcinol resin (DFK resin) of a thermosetting type of, e.g., monohydric and polyhydric phenol is preferred. Furthermore, a PET nonwoven fabric impregnated with a DFK resin (for example, DFK, Ltd.; trade name: Meiyuka Paper; product number: XP30215-1 (NP80-35)) can be used.

The above-mentioned shape-forming means 30 has a support 31 for supporting the lower surface (another surface) of the plate material P forming the outer surface of the wall portion 12, and pressing members 32, 34, 36, provided above the top side of the support 31, for pressing the upper surface (one surface) of the plate material P forming the inner surface of the wall portion 12 from the upper side (one side). The shape-forming means 30 is constructed so that the plate material P can be heated through the support 31 and the pressing members 32, 34, 36, and the pressing members 32, 34, 36 can be moved forward and backward with respect to the support 31. The pressing members 32, 34, 36 have pressing surfaces with a predetermined width extending in the longer direction of the plate material P so that the plate material P can be pressed in the longer direction with the a desired width as viewed in the shorter direction. The shape-forming means 30 has a first pressing member pair including two first deformation pressing members 32, 32 separated from each other in the shorter direction, a second pressing member pair including two second deformation pressing members 34, 34 separated from each other in the shorter direction, and the shape-forming pressing member 36 disposed between the first pressing member pair and the second pressing member pair. The first and second pressing member pairs are constructed so that they can press the plate material P to a position deeper than the shape-forming pressing member 36. The shape-forming pressing member 36 is formed so that its pressing surface is larger in width in the shorter direction than the deformation pressing member 32, 34. Further, in each pressing member pair, the deformation pressing members 32, 34 positioned on the outer side are respectively larger in width in the shorter direction than the deformation pressing members 32, 34 positioned on the inner side.

Figure 6A:
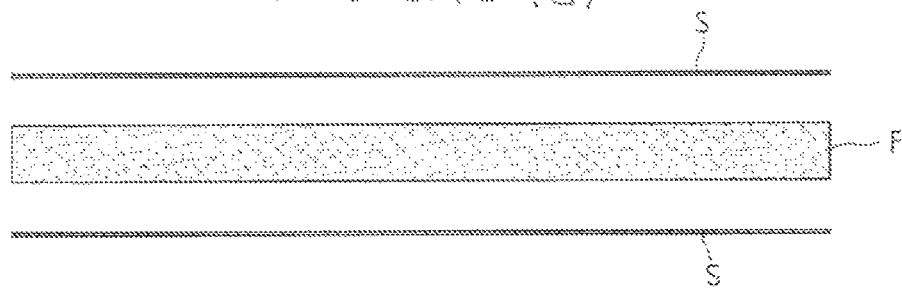
FIG. 6 is explanatory views showing a process for producing the thermal insulating cover of the embodiment.
Figure 6B:
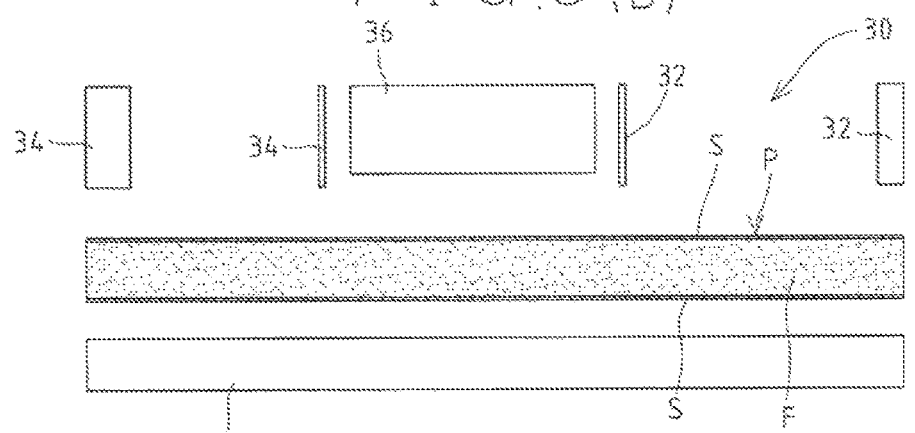
Figure 6C:
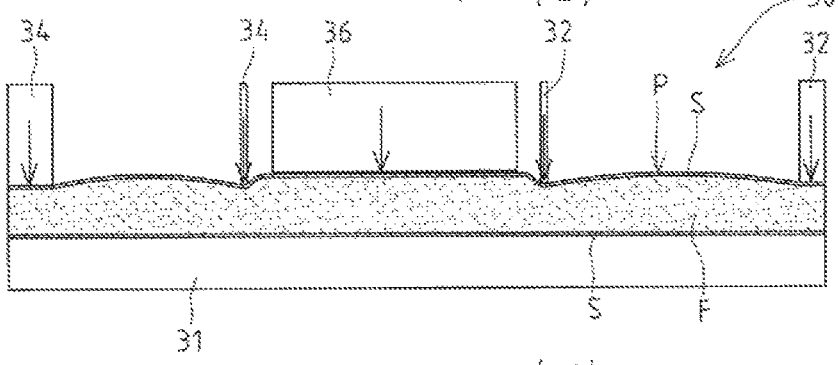
Figure 6D:
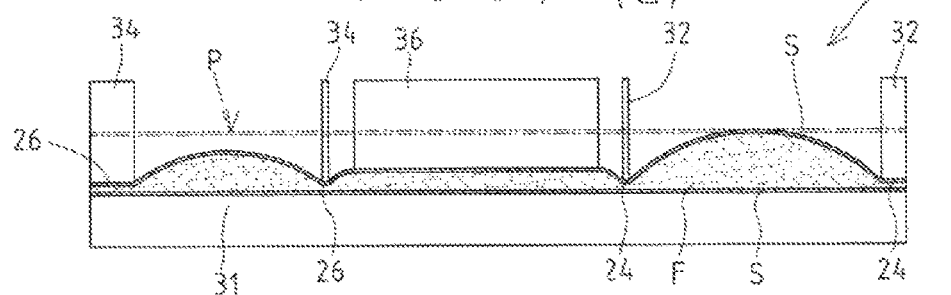

As shown in FIGS. 6(c) and 6(d), the plate material P set in the above-mentioned shape-forming means 30 is compressed, while heating, by pressing in parallel with a space in between the region on the top side of the wall portion 12 using the two first deformation pressing members 32, 32 from the upper side (one side) of the plate material, thus forming the above-mentioned sealing portion 20 between the two compression-shaped pressed portions 24, 24. Simultaneously, the plate material P set in the shape-forming means 30 is compressed by pressing in parallel with a space in between the region on the bottom side of the wall portion 12 using the two second deformation pressing members 34, 34 from the upper side while heating, thus forming the above-mentioned reinforcing portion 22 between two compression-shaped second pressed portions 26, 26. Further simultaneously, an intermediate portion of the plate material P is compressed by pressing using the shape-forming pressing member 36 from above the plate material over a predetermined range while heating to form the above-mentioned compression-shaped general portion 18 so as to be depressed to be lower than the distal end (upper end) of the sealing portion 20 and the reinforcing portion 22. By such compression-shaping, the plate material P having the above-mentioned general portion 18, sealing portion 20, and reinforcing portion 22 can be easily formed.

As the positions of the plate material P separated from each other in the shorter direction are pressed in parallel by the two deformation pressing members 32, 32, 34, 34 as respective pairings, two lines of pairs of the pressed portions 24, 24, 26, 26 pull the portions between the respective pairs of the pressed portions 24, 24, 26, 26, so that such portions are deformed into curved so as to be lowered down toward the pressed portions 24, 26. Then, the portions, which are between the two pressed portions 24, 24, 26, 26, which are shaped by compression-shaping so as to be smaller in thickness than the original thickness of the plate material P, are pulled by the pressed portions 24, 24, 26, 26 on both sides so that the portions are compressed gradually in the direction from the respective middle portions toward the pressed portions 24, 24, 26, 26, and thus the sealing portion 20 and the reinforcing portion 22 each in a mountain-like shape rising in the direction from the pressed portions 24, 24, 26, 26 on both sides to their respective middle portions are individually formed. Thus, the sealing portion 20 and the reinforcing portion 22 are not formed by, using, e.g., a die, directly pressing the portions of the plate material P in which the sealing portion 20 and the reinforcing portion 22 are to be formed, but they are indirectly formed by compression-shaping applied to both sides of the positions in which the sealing portion 20 and the reinforcing portion 22 are to be formed. The pressed portion 24, which is compression-shaped by the first deformation pressing member 32 positioned on the outside among the first pressing member pair, constitutes the upper general portion 18C that extends toward the upper side of the sealing portion 20, and the second pressed portion 26, which is compression-shaped by the second deformation pressing member 34 positioned on the outside among the second pressing member pair, constitutes the lower general portion 18B that extends toward the lower side of the reinforcing portion 22.

In this embodiment, the cover is formed so that the thickness size of the sealing portion 20 at the distal end is substantially the same as the thickness of the plate material P before compression-shaping, and the thickness size of the reinforcing portion 22 at the distal end is smaller than the thickness of the plate material P before compression-shaping. When the space between the two pressed portions 24, 24 (26, 26) as a pairing is appropriately large, the middle portion (distal end) of the sealing portion 20 (reinforcing portion 22) formed between the pressed portions 24, 24 (26, 26) is not compressed, and, when the space between the two pressed portions 24, 24 (26, 26) as a pairing is small, the middle portion of the sealing portion 20 (reinforcing portion 22) is compressed, so that the protruding size of the sealing portion 20 (reinforcing portion 22) from the pressed portions 24, 24 (26, 26) is reduced. Thus, by changing the space between the two separate deformation pressing members 32, 32 (34, 34) as a pressing member pair to control the space between the two separate pressed portions 24, 24 (26, 26) compression-shaped by the deformation pressing members 32, 32 (34, 34), the protruding size of the sealing portion 20 (reinforcing portion 22) from the pressed portions 32, 32 (34, 34) can be easily controlled within the range of the original thickness of the plate material P. By increasing the space between the two pressed portions 24, 24 (26, 26) as a pairing, the distal end of the sealing portion 20 (reinforcing portion 22) between the pressed portions 24, 24 (26, 26) can be formed into a flat surface form, instead of an arc.

In the above-mentioned sealing portion 20 (reinforcing portion 22), the shaped pressed portions 32, 32 (34, 34) pull the thermal insulating layer 14 constructed by the foam body F between the pressed portions 32, 32 (34, 34) to be compressed and deformed into a protrusion form, and the degree of compression of the thermal insulating layer 14 gradually increases as being closer to the pressed portions 32, 32 (34, 34). In other words, in the sealing portion 20 (reinforcing portion 22), the density of the thermal insulating layer 14 is gradually increased in the direction from the shorter direction middle portion toward the proximal end sides continuous to the pressed portions 32, 32 (34, 34). The density of the thermal insulating layer 14 constituting the middle portion of the reinforcing portion 22, which is more strongly compressed than the sealing portion 20, is higher than the density of the thermal insulating layer 14 constituting the middle portion of the sealing portion 20. Thus, without using the foam bodies F, having different densities, depending on the locations, for instance, where the sealing portion 20 is provided, it is easily possible that the density of the thermal insulating layer 14 of the sealing portion 20 (reinforcing portion 22) formed between the pressed portions 32, 32 (34, 34) is gradually reduced or increased by compression-shaping the two pressed portions 32, 32 (34, 34) that are separate from each other in parallel in the plate material P. Further, in the portion between the deformation pressing members 32, 34 which are positioned on the inner side respectively among the first pressing member pair and the second pressing member pair, the intermediate general portion 18A compression-shaped by the shape-forming pressing member 36 is more strongly compressed in its thermal insulating layer 14 than the middle portions of the sealing portion 20 and the reinforcing portion 22, and the density of the thermal insulating layer 14 of the intermediate general portion 18A is higher than the thermal insulating layer 14 constituting the middle portion of the sealing portion 20 and the reinforcing portion 22.

Further, in the shape-forming means 30, by compression-shaping to the plate material P while heating, the adhesive exhibits adhesive force when heated, so that the skin material S and the foam body F are bonded by the adhesive and unify the skin layer 16, constructed by the skin material S, on both surfaces of the thermal insulating layer 14 of the foam body F. Thus, without preliminarily bonding together the foam body F and the skin material S, the thermal insulating layer 14 and the skin layer 16 can be unified together utilizing the heating applied when forming the sealing portion 20, the general portion 18, and the reinforcing portion 22, and it is possible to enable the production process to be efficient.

Finally, the plate material P is shaped into a cylindrical form so that the above-mentioned sealing portion 20, the general portion 18, and the reinforcing portion 22 are positioned inside. Thus, a thermal insulating cover 10 is obtained in which the wall portion 12 having the general portion 18 and the reinforcing portion 22 disposed to be separate from the side surface of the box body B1 of the battery B and further having one sealing portion 20 elastically abutting on the upper portion of the side surface of the box body B1, when the thermal insulating cover is fitted on the battery B. The thermal insulating cover 10 shaped into a cylindrical form is obtained by bonding and fixing together both ends of the plate material P stacked on one another by, e.g., ultrasonic welding or hooking a part formed at one end of the plate material P to a slit formed in the other end of the plate material P.

A polyurethane foam preferable as the foam body F constituting the above-mentioned wall portion 14 will be described. The polyurethane foam is obtained by reacting urethane raw materials containing a polyol, a polyisocyanate, a foaming agent, and a catalyst to foam and cure them. A flame retardant or other additive may be added to the urethane raw materials. Specifically, the urethane raw materials preferably contain, for example, expanded graphite as a flame retardant, or a hydrate of an inorganic compound. The polyurethane foam is comprised of a hard segment based mainly on a urethane linkage and a soft segment based on, e.g., a polyether linkage. The urethane foam exhibits physical properties, such as rigidity and stiffness, due to the hard segment and exhibits physical properties, such as flexibility and elasticity, due to the soft segment.

As the above-mentioned polyol, for example, polyether polyol, polyester polyol, or polymer polyol is used. Examples of polyether polyols include a polyether polyol having a polymer obtained by subjecting a polyhydric alcohol, such as polypropylene glycol, polytetramethylene glycol, dipropylene glycol, glycerol, or trimethylolpropane, to addition polymerization with an alkylene oxide, such as propylene oxide or ethylene oxide, and modification products thereof. Specific examples of polyether polyols include a triol obtained by subjecting glycerol to addition polymerization with propylene oxide and further subjecting the resultant product to addition polymerization with ethylene oxide, and a diol obtained by subjecting dipropylene glycol to addition polymerization with propylene oxide and further subjecting the resultant product to addition polymerization with ethylene oxide.

As the above-mentioned polyester polyol, a condensation polyester polyol obtained by reacting a polycarboxylic acid, such as adipic acid or phthalic acid, with a polyol, such as ethylene glycol, diethylene glycol, propylene glycol, or glycerol, a lactone polyester polyol, or a polycarbonate polyol is used. The polyether polyol is preferred as compared to the polyester polyol in a point that the polyether polyol has excellent reactivity with a polyisocyanate and suffers no hydrolysis.

The above-mentioned polymer polyol is obtained by graft-polymerizing vinyl monomers on the polyether polyol. The graft portion of the polymer polyol reinforces the polyurethane foam, and the polyether polyol has a function such that the polyether polyol enhances the crosslinking density of the polyurethane foam to increase the hard segments, improving the polyurethane foam in rigidity and moldability (thermoformability). As the vinyl monomer, for example, acrylonitrile, styrene, or methyl methacrylate is used. Vinyl monomers are graft-polymerized on the polyether polyol in accordance with an ordinary method to obtain a polymer polyol. The amount of the vinyl monomers contained, that is, the amount of the vinyl monomer units (graft portion) contained in the polymer polyol is preferably 10 to 40% by mass, more preferably 15 to 30% by mass, based on the total mass of the vinyl monomer units and the polyether polyol. When the amount of the vinyl monomer units contained is less than 10% by mass, it is likely that the graft portion in the polymer polyol is lacking, so that the function of the graft portion is unsatisfactorily exhibited. When the amount of the vinyl monomer units contained is more than 40% by mass, it is likely that the graft portion is excess such that the polyurethane foam becomes too hard.

The polymer polyol preferably has a mass average molecular weight of 3000 to 6000. When the mass average molecular weight of the polymer polyol is less than 3000, the action of the graft portion is not satisfactorily exhibited, making it difficult to improve physical properties of the polyurethane foam, such as rigidity or moldability. On the other hand, when the mass average molecular weight of the polymer polyol is more than 6000, the hardness of the polyurethane foam disadvantageously tends to be too high. The amount of the polymer polyol contained is preferably 40 to 75% by mass, based on the total mass of the polymer polyol and the below-mentioned low molecular-weight polyether polyol. Accordingly, the amount of the low molecular-weight polyether polyol contained is preferably 25 to 60% by mass. When the amount of the polymer polyol contained is less than 40% by mass or the amount of the polyether polyol contained is more than 60% by mass, the function of the polymer polyol is not satisfactorily exhibited. On the other hand, when the amount of the polymer polyol contained is more than 75% by mass or the amount of the polyether polyol contained is less than 25% by mass, it is disadvantageously likely that the polyurethane foam is lacking in the crosslinking density to reduce its rigidity.

As the polyether polyol, for increasing the crosslinking density of the polyurethane foam to improve the mechanical physical properties, a low molecular-weight polyether polyol, i.e., a polyether polyol having a mass average molecular weight of 400 to 1000 obtained by subjecting a polyhydric alcohol to addition polymerization with an alkylene oxide is preferably contained. Such a low molecular-weight polyether polyol is obtained using the same raw materials as those for the above-mentioned polyether polyol by the same producing method. Specific examples of low molecular-weight polyether polyols include a triol obtained by subjecting glycerol to addition to polymerization with propylene oxide, a triol obtained by subjecting the thus-obtained triol further to addition polymerization with ethylene oxide, a diol obtained by subjecting dipropylene glycol to addition polymerization with propylene oxide, and polypropylene glycol, and polytetramethylene glycol. When addition polymerization with ethylene oxide is conducted, the amount of the ethylene oxide contained is about 5 to 15 mol %. When the amount of the polyethylene oxide units contained is large, the hydrophilicity becomes high, and mixing properties with, for example, highly polar molecules and a polyisocyanate become excellent, thus increasing the reactivity. When the mass average molecular weight of the low molecular-weight polyether polyol is less than 400, the crosslinking density of the polyurethane foam becomes too high and further the hard segment is increased, so that the hardness disadvantageously becomes too high. On the other hand, when the mass average molecular weight of the low molecular-weight polyether polyol is more than 1000, it is likely that the action of the low molecular-weight polyether polyol is not satisfactorily exhibited, an that the polyurethane foam becomes soft.

As the polyether polyol, for improving the polyurethane foam in flexibility, a high molecular-weight polyether polyol, i.e., a polyether polyol having a mass average molecular weight of 2000 to 4000 obtained by subjecting a polyhydric alcohol to addition polymerization with an alkylene oxide is preferably contained. When the high molecular-weight polyether polyol is reacted with a polyisocyanate, the ratio of the soft segment in the polyurethane foam is increased. When the mass average molecular weight of the high molecular-weight polyether polyol is less than 2000, the crosslinking density of the polyurethane foam is increased and the effect of incorporation of the high molecular-weight polyether polyol becomes poor. On the other hand, when the mass average molecular weight of the high molecular-weight polyether polyol is more than 4000, the flexibility of the polyurethane foam disadvantageously becomes high. The amount of the high molecular-weight polyether polyol contained is preferably 50% by mass or less, based on the total mass of the above-mentioned polymer polyol and the low molecular-weight polyether polyol. When the amount of the high molecular-weight polyether polyol contained is more than 50% by mass, the flexibility of the polyurethane foam becomes too high.

The polyether polyol may be a polyether ester polyol. Such a polyether ester polyol is a compound obtained by reacting a polyoxyalkylene polyol with a polycarboxylic anhydride and a compound having a cyclic ether group. Examples of polyoxyalkylene polyols include propylene oxide addition products of polyethylene glycol, polypropylene glycol, or glycerol. Examples of polycarboxylic anhydrides include anhydrides of; e.g., succinic acid, adipic acid, or phthalic acid. Examples of compounds having a cyclic ether group include ethylene oxide and propylene oxide.

The above-described polyol can be changed in the functional group number for hydroxyl group and the hydroxyl value by controlling, for example, the type of the raw material component therefor, the molecular weight, or the condensation degree. For increasing the crosslinking density of the polyurethane foam to improve physical properties, such as rigidity, the raw materials for urethane preferably further contain a trifunctional crosslinking agent for hydroxyl group. The crosslinking agent reacts with a polyisocyanate to form a crosslinked structure in a polyurethane foam, and, specifically, for example, glycerol or trimethylolpropane is used.

The above-mentioned polyisocyanate is a compound having a plurality of isocyanate groups, and, specifically, for example, tolylene diisocyanate (TDI), 4,4-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate, isophorone diisocyanate (IPDI), or a modification product thereof is used. The isocyanate index of the polyisocyanate may be 100 or less or more than 100 but is preferably 80 to 110. When the isocyanate index is less than 80, the amount of the polyisocyanate contained is small, making it difficult to obtain a polyurethane foam having excellent mechanical physical properties, such as rigidity. On the other hand, when the isocyanate index is more than 110, the heat generation temperature upon foaming is increased, and further the polyurethane foam is lowered in flexibility. Here the isocyanate index is indicated by the equivalent ratio of isocyanate groups of the polyisocyanate to hydroxyl groups of the polyol, hydroxyl groups of the crosslinking agent, and active hydrogen groups of, e.g., water as a foaming agent, in terms of a percentage. Accordingly, the isocyanate index of more than 100 means that the polyisocyanate is excess relative to, for example, the polyol.

As the foaming agent for causing a polyurethane resin to foam, for example, pentane, cyclopentane, hexane, cyclohexane, dichloromethane, methylene chloride, or carbonic acid gas is used in addition to water. As the foaming agent, water is preferable because water exhibits high reactivity of the foaming reaction and is easy to handle. When the foaming agent is water, for obtaining a polyurethane foam having an apparent density as low as 11 to 30 kg/m$^3$, the amount of the water contained is preferably 5 to 15 parts by mass, relative to 100 parts by mass of the polyol. When the amount of the water contained is less than 5 parts by mass, the foam amount tends to be small such that the resultant polyurethane foam has an apparent density of more than 30 kg/m$^3$, making it difficult to obtain a polyurethane foam having a lowered density. On the other hand, when the amount of the water contained is more than 15 parts by mass, the temperature during the reaction and foaming is likely to be increased, and thus is difficult to lower.

The catalyst is used for promoting, for example, a urethane forming reaction of a polyol and a polyisocyanate, or a foaming reaction of a polyisocyanate and water as a foaming agent. As the catalyst, specifically, for example, a tertiary amine, such as triethylenediamine, dimethylethanolamine, or N,N',N'-trimethylaminoethylpiperazine, an organometallic compound, such as tin octanoate or dibutyltin dilaurate, an acetate, or an alkali metal alcoholate is used. As the catalyst, for increasing the effect thereof, an amine catalyst and a metal catalyst are preferably used in combination. The amount of the amine catalyst contained is preferably 0.01 to 0.5 parts by mass, relative to 100 parts by mass of the polyol. When the amount of the amine catalyst contained is less than 0.01 parts by mass, the urethane forming reaction and foaming reaction cannot be promoted satisfactorily with an excellent balance between the reactions. On the other hand, when the amount of the amine catalyst contained is more than 0.5 parts by mass, there is a possibility that the urethane forming reaction and foaming reaction are excessively promoted, or the balance between the reactions is poor, disadvantageously. The amount of the metal catalyst contained is preferably 0.1 to 0.5 parts by mass, relative to 100 parts by mass of the polyol. When the amount of the metal catalyst contained is less than 0.1 parts by mass, the balance between the urethane forming reaction and the foaming reaction is poor, making it impossible to advantageously perform foaming. On the other hand, when the amount of the metal catalyst contained is more than 0.5 parts by mass, the urethane forming reaction and foaming reaction are excessively promoted, and further the balance between the reactions is poor, so that the strain properties of the urethane foam become poor.

Expanded graphite as the flame retardant has a chemical substance intercalated between layers of the scaly graphite. Examples of chemical substances to be intercalated include nitric acid, potassium permanganate, and sulfuric acid, and sulfuric acid having a high expansion starting temperature is preferable. The expanded graphite preferably has an average particle diameter of 45 to 500 μm. Further, the expanded graphite preferably has an expansion starting temperature of 180 to 200° C., and an expansion volume of, for example, 100 to 300 ml/g. It is considered that expanded graphite is heated upon burning to be expanded and the chemical substance intercalated generates gas to form a solid phase having flame retardancy, exhibiting low flammability. The resultant polyurethane foam containing the expanded graphite can satisfy the test for flammability in accordance with the Federal Motor Vehicle Safety Standards of the United States, and further satisfy the flammability test after a heat aging test and the flammability test after a wet heat aging test. The amount of the expanded graphite contained is preferably 5 to 50 parts by mass, relative to 100 parts by mass of the polyol. When the amount of the expanded graphite contained is less than 5 parts by mass, the effect of imparting low flammability to the polyurethane foam disadvantageously tends to be poor. On the other hand, when the amount of the expanded graphite contained is more than 50 parts by mass, the excess expanded graphite tends to inhibit foaming, making it difficult to obtain an excellent polyurethane foam. As a flame retardant other than the expanded graphite, a generally known flame retardant, e.g., a phosphorus flame retardant, such as oxydi-2,1-ethanediyl tetrakis(2-chloro-1-methylethyl)phosphate (halogen-containing flame retardant) or a phosphate (non-halogen flame retardant), or a halogen flame retardant, such as tetrabromobisphenol A, may be incorporated according to an ordinary method.

Hydrate of the above-mentioned inorganic compound is a material which is decomposed when heated and forms water due to the decomposition. The inorganic compound hydrate undergoes dissociation to form water and lowers the heat generation temperature utilizing the latent heat of vaporization of the water formed to increase the amount of water serving as a foaming agent, making it possible to form a polyurethane foam having a reduced density and further to exhibit a function of suppressing discoloration of the foam. As the inorganic compound hydrate, specifically, calcium sulfate dihydrate [$CaSO_4.2H_2O$, gypsum dihydrate; specific gravity: 2.32; decomposition temperature: 128 to 163° C. (−1.5 $H_2O$ to −2.0 $H_2O$)], magnesium sulfate heptahydrate [$MgSO_4.7H_2O$; specific gravity: 1.68; decomposition temperature: 150° C. (−6$H_2O$)], magnesium phosphate octahydrate [$(Mg)_3(PO_4)_2.8H_2O$; specific gravity: 2.41; decomposition temperature: 120° C. (−5$H_2O$)], monohydrate to pentahydrate of iron sulfate ($FeSO_4.H_2O$ to $FeSO_4.5H_2O$; specific gravity: 2.97; decomposition temperature: 100 to 130° C.), or a mixture thereof is used.

Water of hydration contained in the inorganic compound hydrate is stably present as solid crystal at ambient temperature, and it is water of crystallization. As the inorganic compound hydrate, for example, a calcium sulfate hydrate, a magnesium sulfate hydrate, and a magnesium phosphate hydrate are preferred. These hydrates are preferable because the hydrate slowly undergoes dissociation (decomposition) according to the foaming process for the urethane raw materials, for example, at 100° C. or higher to form water, and can exhibit an endothermic action based on the latent heat of vaporization. The inorganic compound hydrate preferably has a specific gravity of 1.5 to 3.0. When the specific gravity of the inorganic compound hydrate is less than 1.5, the inorganic compound hydrate (powder) in a large amount in terms of a volume must be added to a urethane raw material, for example, a polyol, so as to add a predetermined mass of the compound, and the powder and the polyol cannot be satisfactorily stirred and mixed with each other. In addition, the volume of the inorganic compound hydrate contained in the polyurethane foam becomes so large that the physical properties of the polyurethane foam become poor. On the other hand, when the specific gravity of the inorganic compound hydrate is more than 3.0, the inorganic compound hydrate stored for a long term in a urethane raw material, particularly in a polyol, is likely to settle to cause the dispersibility in the reaction mixture to be poor, so that the function of the inorganic compound hydrate to lower the heat generation temperature becomes poor.

The inorganic compound hydrate preferably has a decomposition temperature of 100 to 170° C. When the decomposition temperature of the inorganic compound hydrate is lower than 100° C., decomposition occurs to form water at the initial stage of foaming and curing of the urethane raw materials, namely, at the stage in which the heat generation temperature is low, and therefore there is a possibility that the formed water adversely affects the foaming and curing or functions as a foaming agent. In this connection, with respect to calcium sulfate dihydrate (gypsum dihydrate), among 2 mol of water in the molecule, 1.5 mol of water is decomposed at 128° C. to become free water, resulting in calcium sulfate 0.5 hydrate (gypsum hemihydrate). Further, with respect to magnesium sulfate heptahydrate, among 7 mol of water in the molecule, 6 mol of water is decomposed at 150° C. to become free water, resulting in magnesium sulfate monohydrate. The amount of the inorganic compound hydrate contained is preferably 10 to 80 parts by mass, more preferably 10 to 50 parts by mass, relative to 100 parts by mass of the polyol. When the amount of the inorganic compound hydrate contained is less than 10 parts by mass, the amount of the water formed due to the decomposition is small so that an increase of the heat generation temperature caused due to the reaction and foaming cannot be satisfactorily suppressed. On the other hand, when the amount of the inorganic compound hydrate contained is more than 80 parts by mass, there is a possibility that physical properties of the polyurethane foam, such as rigidity or moldability, are lowered.

For facilitating the foaming, the urethane raw materials preferably contain a foam stabilizer. As a foam stabilizer, one generally used in producing a polyurethane foam can be used. As a foam stabilizer, specifically, for example, a silicone compound, an anionic surfactant, such as sodium dodecylbenzenesulfonate or sodium laurylsulfate, a polyether siloxane, or a phenolic compound is used. The amount of the foam stabilizer contained is preferably 0.5 to 2.5 parts by mass, relative to 100 parts by mass of the polyol. When the amount of the foam stabilizer contained is less than 0.5 parts by mass, the foam stabilization action is not satisfactorily exhibited upon foaming of the urethane raw materials, making it difficult to obtain an excellent foam. On the other hand, when the amount of the foam stabilizer contained is more than 2.5 parts by mass, the foam stabilization action tends to be strong, so that communicating properties of the cells become poor. Further, if necessary, a filler, a stabilizer, a colorant, or a plasticizer is incorporated into the urethane raw materials. When a polyurethane foam is produced, any of a one-shot method or a prepolymer method is employed. The polyurethane foam may be produced by any method of slab foaming and mold foaming, but slab foaming is preferable in that continuous production can be made. The above-described urethane foam is advantageous not only in that the foam has excellent moldability upon hot compression and can be appropriately shaped, but also in that the foam is lightweight and has flame retardancy, and therefore is suitable for the thermal insulating cover 10 placed in an engine room.

The thus constructed thermal insulating cover 10 is fitted on the battery B from above so that the battery B is contained inside the cover. The thermal insulating cover 10 is formed so that the lower opening defined by the lower general portion 18B is larger than the external shape size of the battery B, and therefore the lower opening can be easily fitted on the upper portion of the battery B to achieve positioning. Further, the thermal insulating cover 10 is formed so that the inner region defined by the reinforcing portion 22 and the intermediate general portion 18A is larger than the external shape size of the battery B, and therefore the thermal insulating cover 10 can be brought down along the side surface of the battery B without sliding the inner surface of the wall portion 12 on the side surface of the battery B, or while suppressing the sliding to as small a degree as possible. In other words, the thermal insulating cover 10 can be fitted with a small load until the sealing portion 20 formed at the upper portion of the wall portion 12 has reached the upper portion of the battery B.

The above-mentioned thermal insulating cover 10 is designed so that the inner region defined by the sealing portion 20 formed at the upper portion of the wall portion 12 is smaller than the external shape size of the battery B, and, in the final stage of the fitting, the thermal insulating cover 10 is lowered while allowing the sealing portion 20 abutting on the side surface of the battery B to be in contact with the side surface. The sealing portion 20 is formed at the upper portion of the wall portion 12, and therefore the range in which the thermal insulating cover 10 is lowered while abutting the sealing portion 20 on the side surface of the battery B is narrow, and thus the range in which a load is applied upon fitting the thermal insulating cover 10 on the battery B is small. Further, in the stage in which the sealing portion 20 is abutting on the side surface of the battery B, most portion of the wall portion 12 covers the battery B, and therefore it is easy to apply a force to the cover, and, even when a load is increased, such a problem is unlikely to occur that, for example, the cover is obliquely deflected in position or is deformed, or the portion of the cover extending from the upper portion of the battery B is bent. In the sealing portion 20, the density of the thermal insulating layer 14 constituting the distal end is low so that the portion abutting on the battery B is relatively soft, and therefore the sliding load of the sealing portion 20 on the battery B can be reduced. As can be seen from the above, the thermal insulating cover 10 of this embodiment is advantageous in that the wall portion 12 is provided with the general portion 18 so that the sealing portion 20 abutting on the battery B becomes smaller, making it easy to fit the cover on the battery B.

The above-mentioned thermal insulating cover 10, when it is in a state of being fitted on the battery B so that the wall portion 12 covers the entire periphery of the side surface of the battery B, seals the lower portion of the battery by abutting the lower end of the wall portion 12 on the supporting plate C that has the battery B placed thereon. Further, when the thermal insulating cover 10 is fitted on the battery B, the space G is formed between the general portion 18 and the reinforcing portion 22 each separating from the side surface of the battery B and the side surface, and the upper portion of the space G is closed by the sealing portion 20 abutting on the side surface of the battery B; accordingly, it is possible to seal the space G so as not to communicate with the outside. In other words, the thermal insulating cover 10 achieves not only thermal insulation performance of the wall portion 12 itself but also a thermal insulation action obtained by an air layer present in the closed space G, and thus exhibits excellent thermal insulation performance as a whole. Further, at the lower portion of the wall portion 12 is formed the reinforcing portion 22 which protrudes more largely than the general portion 18, and therefore the reinforcing portion 22 can reduce the gap with the side surface of the battery B.

The thermal insulating layer 14 constituting the above-mentioned sealing portion 20 is constructed so that the density on the side of each end of the protrusion continuous to the general portion 18 is higher than other portion, and therefore the end side can elastically support the top side which abuts on the side surface of the battery B to elastically deform. By virtue of this, not only can flattening of the sealing portion 20 be suppressed, but also elastically abutting of the sealing portion 20 on the side surface of the battery B is maintained, so that the sealed state of the above-mentioned space G can be advantageously kept. Further, by providing the reinforcing portion 22 formed to be thicker than the general portion 18 in the wall portion 12, the thermal insulating cover 10 can be improved in the stiffness as a whole.

The polyurethane foam in the embodiment constituting the above-mentioned thermal insulating layer 14 can be formed as described below. The raw materials for the polyurethane foam in the embodiment are as follows:

(1) Polyols

Polyether polyol A: 30 parts by mass
Polyether polyol (product number: GP3000) obtained by subjecting glycerol to addition polymerization with propylene oxide and having a mass average molecular weight of 3000, a hydroxyl value of 56 mg KOH/g, and a functional group number 3 for hydroxyl group.

Polyether polyol B: 50 parts by mass
Polyether polyol (product number: EXCENOL 941) obtained by subjecting 40% by mass of a mixture having a styrene:acrylonitrile mass ratio of 8:2 to graft polymerization on 60% by mass of polyether polyol obtained by subjecting glycerol to addition polymerization with propylene oxide, and having a mass average molecular weight of 5000, a solids content of 40% by mass, a hydroxyl value of 33 mg KOH/g, and a functional group number 3 for hydroxyl group.

Polyether polyol C: 20 parts by mass
Polyether polyol (product number: G700) obtained by subjecting glycerol to addition polymerization with propylene oxide, and having a mass average molecular weight of 700, a hydroxyl value of 240 mg KOH/g, and a functional group number 3 for hydroxyl group.

(2) Polyisocyanate: 123.6 parts by mass,

Tolylene diisocyanate (a mixture of 65% by mass of 2,4-tolylene diisocyanate and 35% by mass of 2,6-tolylene diisocyanate) (product number: T-65, manufactured by Nippon Polyurethane Industry Co., Ltd.).

(3) Others

Glycerol: 5 parts by mass
Gypsum dihydrate: 30 parts by mass; specific gravity: 2.32; average particle diameter: 40 μm.
Water: 10 parts by mass
Amine catalyst: 0.3 parts by mass, dimethylethanolamine
Metal catalyst: 0.3 parts by mass, tin(II) octanoate (product number: MRH-100, manufactured by Johoku Chemical Co., Ltd.)
Foam stabilizer: 1 part by mass, silicone foam stabilizer (product number: F650, manufactured by Shin-Etsu Chemical Co., Ltd.)
Flame retardant: 10 parts by mass, expanded graphite (product number: SYZR502, manufactured by Sanyo Trading Co., Ltd.); average particle diameter: 300 μm; expansion starting temperature: 200° C.; expansion volume: 180 to 200 ml/g.

The above-mentioned raw materials were charged into a foaming container, of which length, width, and depth are each 500 mm, and foamed at ambient temperature under atmospheric pressure, and then they are passed through a heating oven to effect curing (crosslinking), obtaining a soft slab foam. The obtained soft slab foam was cut to produce a polyurethane foam in a sheet form in the embodiment. The polyurethane foam in this embodiment had an apparent density of 16.5 kg/m$^3$, as measured in accordance with JIS K 7222:1999, and a rigidity of 17 kPa in terms of a compression stress as measured at 25% compression with respect to a sample having a length of 150 mm, a width of 100 mm, and a height of 50 mm in accordance with JIS K 6400-2:2004, and was acceptable in a horizontal firing test in accordance with the Federal Motor Vehicle Safety Standards (FMVSS302).

Figure 7:
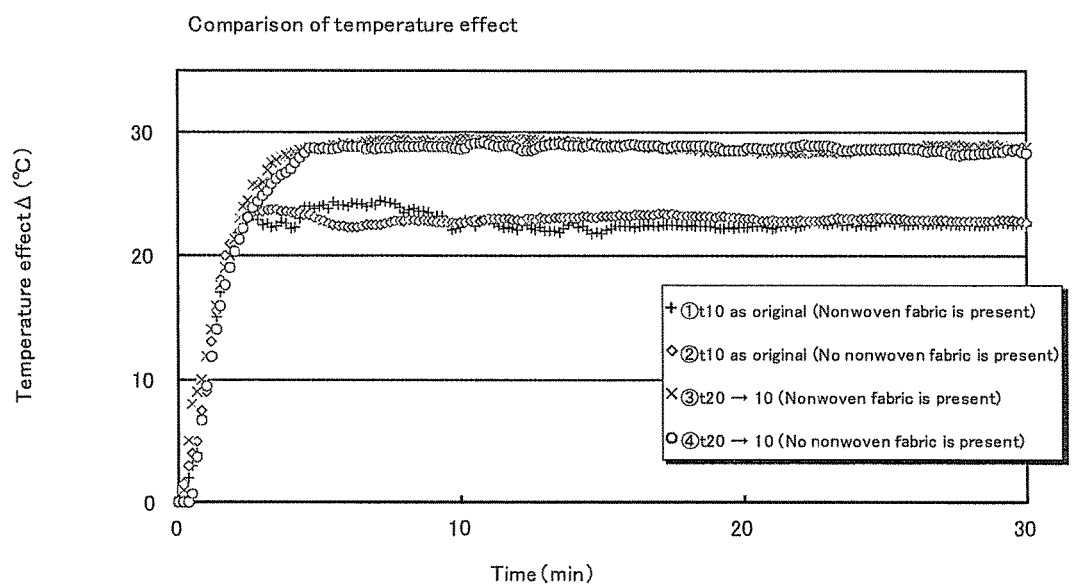
FIG. 7 is a diagram showing the results of a test of heat shielding properties of the wall portion.

A test was conducted with respect to the heat shielding properties of the wall portion. In Test Examples 1 to 4, as a foam constituting the thermal insulating layer, a plate material comprised of the polyurethane foam in the above-mentioned embodiment is used. In Test Examples 2 (② of FIG. 7) and 4 (④ of FIG. 7), a plate material is comprised solely of the polyurethane foam in the embodiment, and, in Test Examples 1 (① of FIG. 7) and 3 (③ of FIG. 7), a plate material is comprised of the polyurethane foam having nonwoven fabric bonded to both surfaces thereof using an adhesive. The nonwoven fabric is comprised of polyethylene terephthalate (PET) fiber impregnated with a DFK resin (trade name: Meiyuka Paper; product number: XP30215-1 (NP80-35); manufactured by DFK, Ltd.), and a basis weight of the nonwoven fabric is 80 g/m$^2$, and a basis weight of the DFK resin with which the nonwoven fabric is impregnated is 35 g/m$^2$. In Test Example 1, the plate material is comprised of the polyurethane foam having a thickness of 10 mm in the embodiment and having the above-mentioned nonwoven fabric bonded to both surfaces thereof, and has not been subjected to hot compression. In Test Example 2, the plate material is comprised solely of the polyurethane foam having a thickness of 10 mm in the embodiment, and has not been subjected to hot compression. In Test Example 3, the plate material is comprised of the polyurethane foam having a thickness of 20 mm in the embodiment and having the above-mentioned nonwoven fabric bonded to both surfaces thereof, and has been subjected to hot press at a heating temperature of 190° C. for 45 seconds to have a thickness of 10 mm. In Test Example 4, the plate material is comprised solely of the polyurethane foam having a thickness of 20 mm in the embodiment, and has been subjected to hot press at a heating temperature of 190° C. for 45 seconds to have a thickness of 10 mm. The respective test specimens in Test Examples 1 to 4 were disposed in a partitioned test box which can be closed, and a heat source at 100° C. was placed at one end of the specimen and a temperature sensor was placed at the other end of the specimen. Then, a temperature difference was measured at an atmosphere temperature of 23° C. over 30 minutes. The results are shown in FIG. 7. As can be seen from FIG. 7, the heat shielding properties are not affected by the presence or absence of the nonwoven fabric, and the compression-shaped covers have more excellent heat shielding properties.

Modified Embodiments

Figure 8:
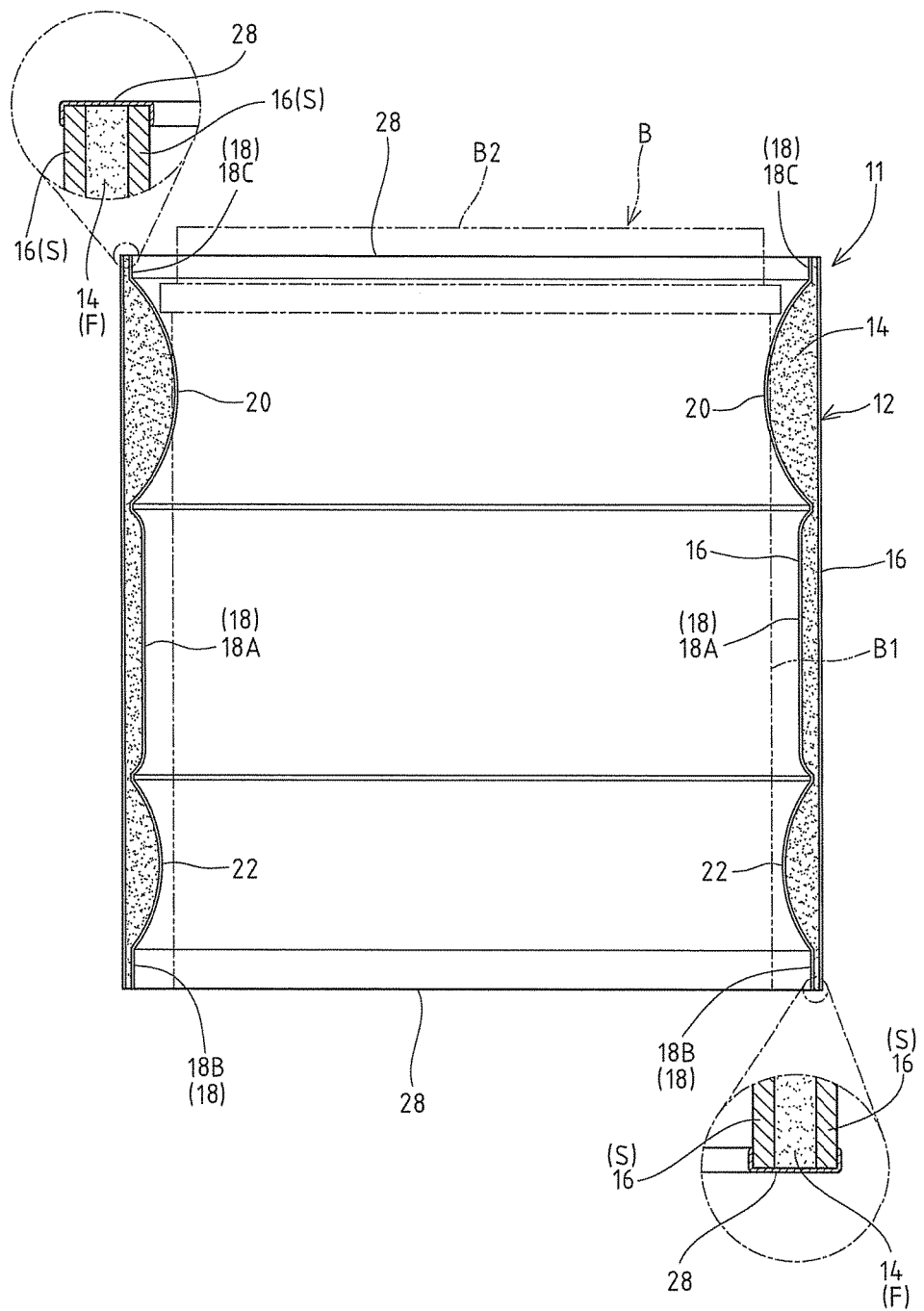
FIG. 8 is a longitudinal cross-sectional view showing the thermal insulating cover of modified embodiment 1.
Figure 9:
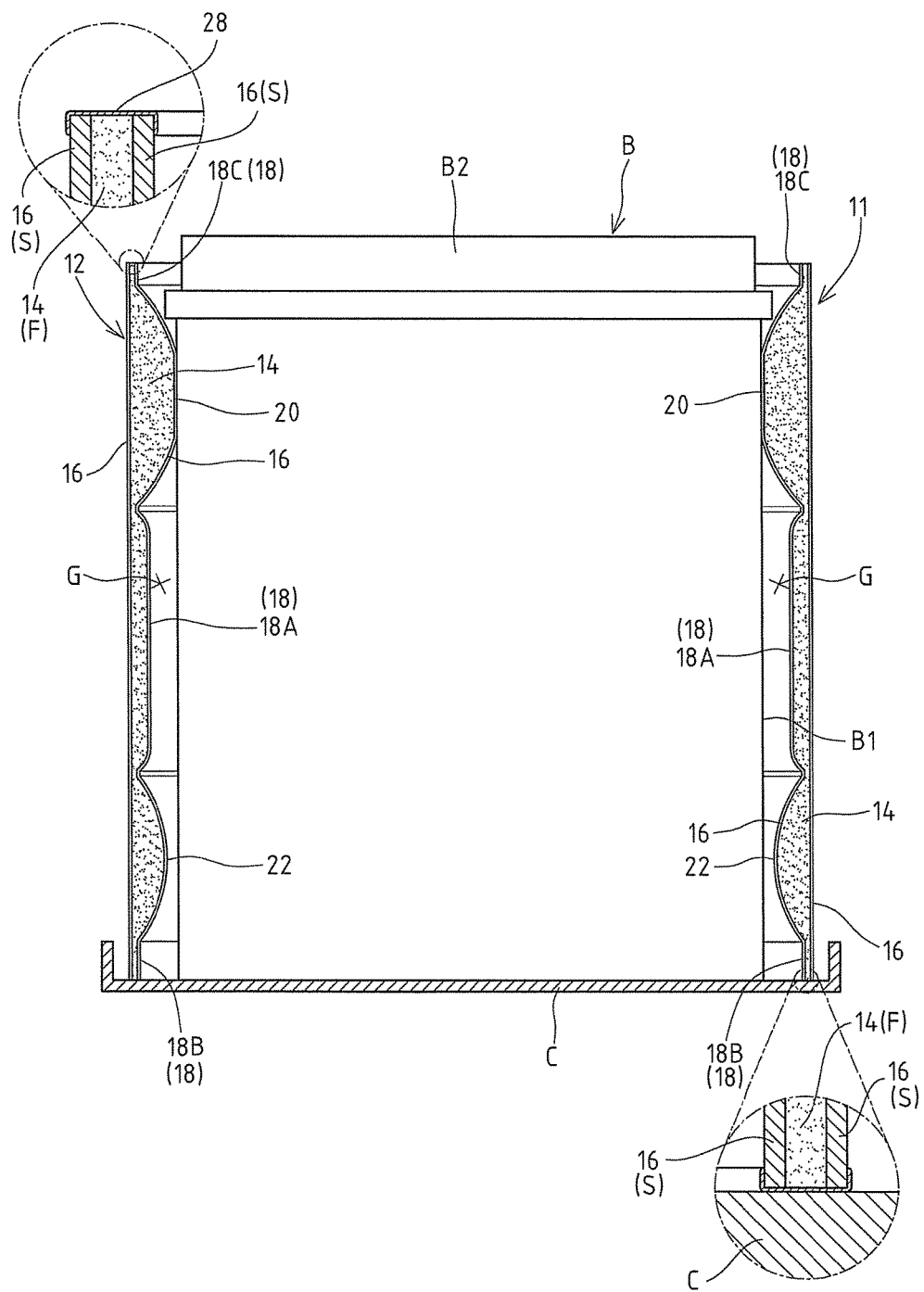
FIG. 9 is a longitudinal cross-sectional view showing the state in which the thermal insulating cover of modified embodiment 1 has been fitted on a battery.

The construction of the thermal insulating cover is not limited to the above-mentioned construction, and can be changed, for example, as follows:

(1) A thermal insulating cover 11 in modified embodiment 1 has a covering portion 28 on the outer edge of the wall portion 12 formed from the foam body F and the skin material S which are stacked on one another so that the skin material S is on the surface side and of which the stacked surfaces are bonded together, and this covering portion 28 is formed to cover at least the end face of the outer edge of the wall portion 12 (see FIGS. 8 and 9), so that the end face in which the foam body F is not covered by the skin materials S is protected by the covering portion 28. The covering portion 28 is formed on all four sides of the outer edge of the plate material P in a rectangular flat plate form before constituting the wall portion 12, so that the entirety of the foam body F and the mating surface of the foam body F and the skin material S are covered by the skin material S and/or the covering portion 28 so as not to be exposed to the outside. In other words, the thermal insulating cover 10 formed from the plate material P in a angled-cylindrical shape has the covering portions 28 formed respectively on both opening edges of the angled-cylindrical shape which opens on the upper and lower sides, and it further has the above-mentioned covering portions 28 formed respectively on the side end facing the inside of the angled-cylindrical shape and the side end facing the outside of the angled-cylindrical shape in the stacked and bonded portions. In the construction of the thermal insulating cover 11 in modified embodiment 1 and that in the embodiment, like parts or portions are indicated by like reference numerals and the descriptions of them are omitted.

The above-mentioned covering portion 28 is formed from an adhesive which can be bonded to the foam body F and the skin material S. As an adhesive, a hot-melt adhesive comprised mainly of a thermoplastic resin, such as a polyamide, or another one, such as a thermosetting resin adhesive, can be used, and the type of adhesive is not limited to hot-melt, and adhesives of various types, such as a two-pack type or a solvent dilution type, can be employed. The covering portion 28 formed by solidifying the adhesive has water repellency such that it is substantially not permeable to water (droplets), and desirably has, for example, a wear resistance like the skin layer 16. The covering portion 28 is formed to cover a region from the end face of the wall portion 12 (plate material P) through which the thermal insulating layer 14 (foam body F) faces the outside to the edge of the skin layer 16 (skin material S) constituting the outer surface (design surface) of the wall portion 12 (plate material P). In other words, the covering portion 28 not only covers the end face of the wall portion 12 (plate material P) but also extends from the end edge of the wall portion 12 over a length of several millimeters on both of the top and bottom surfaces continuously from the portion covering the end face. The covering portion 28 is colored to match the color of the skin material S constituting the skin layer 16. A colorant, such as a pigment, is incorporated to the adhesive constituting the covering portion 28 to control the color of the covering portion 28 to match the color of skin material S. Therefore, even when the foam body F is different in color from the skin material S, the entirety of the thermal insulating cover 11 including the end face through which the thermal insulating layer 14 comprised of the foam body F is exposed has uniformity of color in respect of the color of the skin layer 16 comprised of the skin material S constituting the design surface of the thermal insulating cover 11.

Next, the formation of the covering portion 28 in modified embodiment 1 will be described. With respect to the plate material P which is obtained by hot compression-shaping in a desired shape and bonding together the skin material S and the foam body F by the above-mentioned shape-forming means 30, each side of the outer edge (end) of the plate material is immersed a hot-melt adhesive heated in a liquid state, so that the adhesive is applied to the end. The hot-melt adhesive has been controlled in color by incorporating thereinto, for example, a pigment having a color selected to match the color of the skin material S. The outer edge of the plate material P is dipped in the hot-melt adhesive about several millimeters from the end face and then taken out to apply the adhesive to a region from the end face of the plate material P through which the foam body F faces the outside to the edge of the skin material S. Then, the hot-melt adhesive is solidified by cooling to form the covering portion 28 in the region from the end face of the plate material P through which the foam body F faces the outside to the edge of the skin material S. The thickness of the covering portion 28 can be controlled by appropriately changing the viscosity of the hot-melt adhesive.

In the thermal insulating cover 11 in modified embodiment 1, the end in a region from the end face to the edge is covered by the covering portion 28, and therefore the end face through which the mating surface of the thermal insulating layer 14 comprised of the foam body F and the skin layer 16 comprised of the skin material S is exposed can be protected by the covering portion 28. In other words, the covering portion 28 can prevent the thermal insulating layer 14 and the skin layer 16 from being separated from each other due to such a cause that, for example, water intrudes into the end face of the wall portion 12, or the end face comes into contact with other members, such as the supporting plate C. In addition, the covering portion 28 itself includes an adhesive having adhesive force, and therefore is unlikely to be peeled off from the end of the wall portion 12. Further, the covering portion 28 is formed to extend not only on the end face of the wall portion 12 but also on a region from the end face to the edges of both top and bottom surfaces of the wall portion 12, and therefore a large area bonded to the wall portion 12 can be secured to achieve stronger bonding to the wall portion 12. The end face of the wall portion 12 is covered by the covering portion 28 having a color controlled to match the color of the skin layer 16 constituting the surface of the wall portion 12, and therefore, even when the color of the thermal insulating layer 14 exposed through the end face is different from that of the skin layer 16, the thermal insulating layer 14 can be concealed by the covering portion 28 to improve the thermal insulating cover 11 in the appearance.

Merely by immersing the end of the plate material P constituting the wall portion 12 in the hot-melt adhesive heated in a liquid state and solidifying the adhesive, the covering portion 28 can be easily formed from the adhesive on the end of the plate material P. In addition, there is an advantage in that, for example, the range or thickness of the covering portion 28 to be formed can be easily controlled by changing, e.g., the depth of the plate material P immersed in the adhesive, or the viscosity of the adhesive. In other words, there is no need for a complicated treatment for the end in which, for example, the end of the plate material P is wound to be bonded, or the end is pinched off in a mold, and the plate material P having the covering portion 28 formed thereon can be obtained through a simple step. Further, the color of the covering portion 28 can be easily changed by coloring the adhesive, and color uniformity of the entirety of the thermal insulating cover 11 including the end face can be achieved, obtaining the high-quality thermal insulating cover 11.

Figure 10:
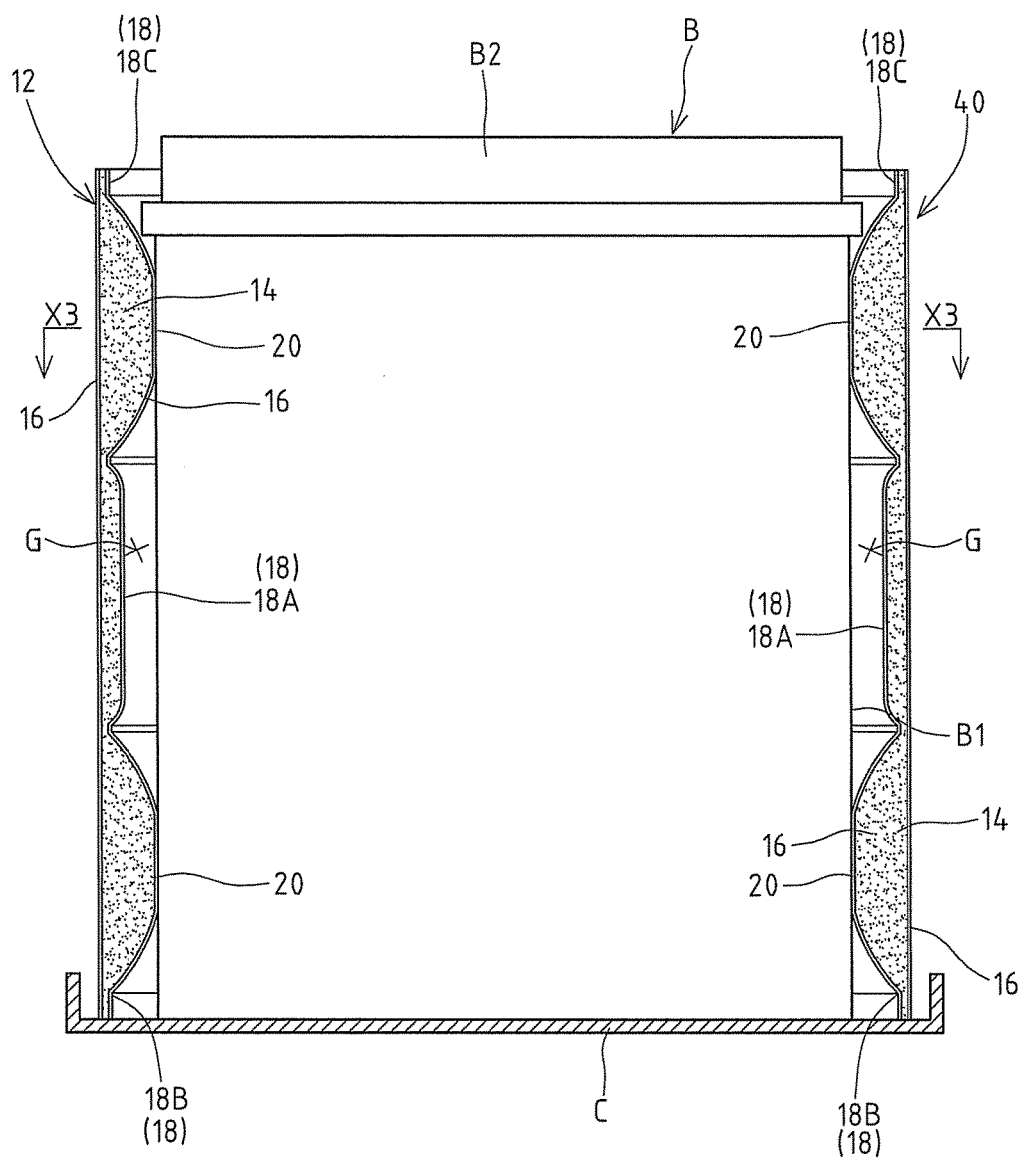
FIG. 10 is a longitudinal cross-sectional view showing the state in which the thermal insulating cover of modified embodiment 2 has been fitted on a battery.

(2) In the embodiment and modified embodiment 1, the construction is employed in which the reinforcing portion that is not in contact with the side surface of the object to be thermally-insulated is formed at the lower portion of the wall portion of the thermal insulating cover, but the construction is not limited to this, and, as shown in FIG. 10, a sealing portion (protruding portion) 20 which is formed to protrude inward more than the general portion 18 and elastically abut on the side surface of the battery B may be formed at the lower portion of the wall portion 12 of the thermal insulating cover 40. Thus, by virtue of the construction in which when fitted the thermal insulating cover 40 of modified embodiment 2 on the battery B, a space formed between the general portion 18 and the side surface of the battery B is closed by the upper and lower sealing portions 20, 20; accordingly, not only the wall portion 12 but also a layer of air present in the space can be utilized to achieve thermal insulation. In addition, with respect to the space formed between the general portion 18 and the side surface of the battery B, the upper side of the space is closed by the sealing portion 20 formed on the upper side of the wall portion 12 and the lower side of the space is closed by the sealing portion 20 formed on the lower side of the wall portion 12, and therefore the flow of air to the space can be suppressed to improve the thermal insulation properties.

(3) The sealing portion is not limited to be provided at one site, and a plurality of separate sealing portions may be formed on the upper and lower sides of the wall portion.

(4) The reinforcing portion is not limited to be provided at one site, and a plurality of separate reinforcing portions may be formed on the upper and lower sides of the wall portion.

(5) The wall portion is not limited to one of a multilayer structure including the thermal insulating layer and the skin layer, and may be of a single layer structure including only the thermal insulating layer, or may have another functional layer in addition to the thermal insulating layer and skin layer.

(6) The positional relationship between the support and the pressing member in the shape-forming means is not limited to that in the embodiments, and may be another construction in which, for example, the support is provided on the upper side and the pressing member is provided on the lower side, or the support and the presser are provided in a positional relationship of right and left.

(7) The object to be thermally-insulated, to which the thermal insulating cover is fitted, is not limited to a battery for automobile, and may be a household battery. Alternatively, the thermal insulating cover may be fitted on other apparatuses, such as a water heating apparatus.

(8) The construction of the above-described thermal insulating cover is in a cylindrical form as an example, but the thermal insulating cover may be formed in a box shape such that the whole surface of an object to be thermally-insulated is covered by the wall portion that covers the side surface of the object to be thermally-insulated as well as by a lid that closes the opening defined by the wall portion.

DESCRIPTION OF REFERENCE NUMERALS

12: wall portion;
14: thermal insulating layer;
18: general portion;
20: sealing portion (protruding portion);
22: reinforcing portion (second protruding portion);
24: pressed portion;
26: second pressed portion;
28: covering portion;
B: battery (object to be thermally-insulated);
F: foam body;
G: space;
P: plate material;
S: skin material.

The invention claimed is:

1. A thermal insulating cover, which is configured to be fitted on a battery, comprising:
   a cylindrical wall portion that is configured to cover an entire periphery of a side surface of the battery, wherein the wall portion has:
   a general portion configured to be separate from the side surface of the battery; and
   a protruding portion formed to protrude inward more than the general portion and configured to elastically abut the side surface of the battery, wherein
   the protruding portion abuts an upper portion of the side surface of the battery and is configured to close a space formed between the side surface of the battery and the general portion,
   the protruding portion is formed by compression-deforming a thermal insulating layer, constructed by a foam body constituting the wall portion, into a shape that extends along a circumferential direction of the wall portion and has upper and lower slanting surfaces, and
   the protruding portion is constructed so that a density of the thermal insulating layer is gradually reduced in a direction from each of upper and lower proximal ends of protrusion continuous to the general portion toward a middle portion side thereof as viewed in a vertical direction.

2. The thermal insulating cover according to claim 1, which has, at a lower portion of the wall portion, a second protruding portion which is formed to protrude inward more than the general portion and has a smaller inward protruding size than that of the protruding portion.

3. The thermal insulating cover according to claim 1, further comprising, at a lower portion of the wall portion, an additional protruding portion which is formed to protrude inward more than the general portion and is configured to elastically abut the side surface of the battery.

4. The thermal insulating cover according to claim 1, wherein
   the wall portion is formed from a skin material and a foam body which are stacked on one another so that the skin material is on a surface side and of which stacked surfaces are bonded together, and
   the wall portion has a covering portion made of an adhesive so as to cover a region from an end face through which the foam body is exposed to an edge of the skin material.

5. The thermal insulating cover according to claim 4, wherein the covering portion is constructed by a hot-melt adhesive.

6. The thermal insulating cover according to claim 4, wherein the covering portion is colored to match a color of the skin material.

* * * * *